US012742381B2

(12) United States Patent
Wang et al.

(10) Patent No.: US 12,742,381 B2
(45) Date of Patent: Sep. 22, 2026

(54) MULTIFUNCTIONAL FLUORESCENT POLYMER-CLAY COMPOSITE TRACERS

(71) Applicant: Saudi Arabian Oil Company, Dhahran (SA)

(72) Inventors: Wei Wang, Quincy, MA (US); Sehoon Chang, Boston, MA (US); Hooisweng Ow, Woburn, MA (US)

(73) Assignee: Saudi Arabian Oil Company, Dhahran (SA)

( * ) Notice: Subject to any disclaimer, the term of this patent is extended or adjusted under 35 U.S.C. 154(b) by 814 days.

(21) Appl. No.: 17/454,181

(22) Filed: Nov. 9, 2021

(65) Prior Publication Data

US 2023/0144199 A1 May 11, 2023

(51) Int. Cl.

| | |
|---|---|
| ***E21B 47/04*** | (2012.01) |
| ***C01B 33/40*** | (2006.01) |
| ***C01B 33/44*** | (2006.01) |
| ***C08F 8/34*** | (2006.01) |
| ***C08F 12/08*** | (2006.01) |
| ***C08F 26/02*** | (2006.01) |

(Continued)

(52) U.S. Cl.

CPC ............. *E21B 47/04* (2013.01); *C01B 33/40* (2013.01); *C01B 33/44* (2013.01); *C08F 8/34* (2013.01); *C08F 12/08* (2013.01); *C08F 26/02* (2013.01); *C09K 11/02* (2013.01); *C09K 11/06* (2013.01); *B82Y 30/00* (2013.01); *C01P 2004/64* (2013.01); *C01P 2006/60* (2013.01); *C09K 2211/10* (2013.01)

(58) Field of Classification Search

None

See application file for complete search history.

(56) References Cited

U.S. PATENT DOCUMENTS

| | | | |
|---|---|---|---|
| 4,772,563 | A | 9/1988 | Evangelista et al. |
| 5,124,268 | A | 6/1992 | Dakubu |

(Continued)

FOREIGN PATENT DOCUMENTS

| | | |
|---|---|---|
| EP | 0171978 | 11/1990 |
| EP | 1721603 | 11/2006 |

(Continued)

OTHER PUBLICATIONS

Scheibel et al.; Copolymer/Clay Nanocomposites for Biomedical Applications; Adv. Funct. Mater., 30, 1908101; 2020.*

(Continued)

*Primary Examiner* — Guinever S Gregorio

(74) *Attorney, Agent, or Firm* — Fish & Richardson P.C.

(57) ABSTRACT

Compositions and methods for determining the origin location of a subterranean sample are provided. Compositions include a polymer-clay composite tag. The tag includes a nanoclay including a plurality of layers, and a polymer intercalated between the layers of the nanoclay. The polymer is functionalized with a fluorescent dye. A method to determine the origin location of a subterranean sample includes mixing a barcoded polymer-clay composite tag into a fluid, flowing the fluid through a work string into a subterranean formation, recovering subterranean samples from the subterranean formation, and determining the origin location of the subterranean sample by detecting the presence of the barcoded polymer-clay composite tag.

24 Claims, 20 Drawing Sheets

(51) Int. Cl.

| | |
|---|---|
| ***C09K 11/02*** | (2006.01) |
| ***C09K 11/06*** | (2006.01) |
| *B82Y 30/00* | (2011.01) |

(56) References Cited

U.S. PATENT DOCUMENTS

| | | | | |
|---|---|---|---|---|
| 5,168,927 | A | 12/1992 | Stegenneier | |
| 6,250,848 | B1 | 6/2001 | Moridis et al. | |
| 6,590,647 | B2 | 7/2003 | Stephenson | |
| 6,691,780 | B2 | 2/2004 | Nguyen et al. | |
| 7,032,662 | B2 | 4/2006 | Malone | |
| 7,485,471 | B1 | 2/2009 | Sun et al. | |
| 7,588,827 | B2 | 9/2009 | Nie et al. | |
| 7,879,625 | B1 | 2/2011 | Boss | |
| 8,269,501 | B2 | 9/2012 | Schmidt et al. | |
| 8,337,783 | B2 | 12/2012 | Locascio et al. | |
| 8,627,902 | B2 | 1/2014 | Hammer | |
| 8,638,104 | B2 | 1/2014 | Barber et al. | |
| 8,877,954 | B2 | 11/2014 | Giesenberg et al. | |
| 9,080,097 | B2 | 7/2015 | Gupta et al. | |
| 9,133,709 | B2 | 9/2015 | Huh et al. | |
| 9,366,099 | B2 | 6/2016 | Ly | |
| 10,273,399 | B2 | 4/2019 | Cox | |
| 10,308,865 | B2 | 6/2019 | Cox | |
| 10,308,895 | B2 | 6/2019 | Vidal et al. | |
| 10,487,259 | B2 | 11/2019 | Cox | |
| 2003/0220204 | A1 | 11/2003 | Baran et al. | |
| 2004/0108110 | A1 | 6/2004 | Zupanick et al. | |
| 2005/0191490 | A1* | 9/2005 | Ton-That ................ | C08J 5/005 428/407 |
| 2005/0252286 | A1 | 11/2005 | Ibrahim et al. | |
| 2006/0105052 | A1 | 5/2006 | Acar et al. | |
| 2006/0293430 | A1* | 12/2006 | Wang ...................... | C08K 9/02 252/378 R |
| 2007/0114030 | A1 | 5/2007 | Todd et al. | |
| 2008/0110253 | A1 | 5/2008 | Stephenson et al. | |
| 2008/0111064 | A1 | 5/2008 | Andrews et al. | |
| 2009/0087911 | A1 | 4/2009 | Rogerio | |
| 2009/0087912 | A1 | 4/2009 | Ramos et al. | |
| 2009/0248309 | A1 | 10/2009 | Nelville et al. | |
| 2009/0277625 | A1 | 11/2009 | Bai et al. | |
| 2010/0049625 | A1 | 2/2010 | Biebesheimer et al. | |
| 2010/0092865 | A1 | 4/2010 | Kanno et al. | |
| 2010/0224823 | A1 | 9/2010 | Yin et al. | |
| 2010/0307745 | A1 | 12/2010 | Lafitte et al. | |
| 2011/0012331 | A1 | 1/2011 | Kim | |
| 2011/0030949 | A1 | 2/2011 | Weaver et al. | |
| 2011/0207231 | A1 | 8/2011 | Natan et al. | |
| 2011/0239754 | A1 | 10/2011 | Dyer et al. | |
| 2011/0257887 | A1 | 10/2011 | Cooper et al. | |
| 2011/0260051 | A1 | 10/2011 | Preudhomme et al. | |
| 2011/0275061 | A1 | 11/2011 | Weidemaier et al. | |
| 2012/0062886 | A1 | 3/2012 | Piotti et al. | |
| 2012/0115128 | A1 | 5/2012 | Miller | |
| 2012/0135080 | A1 | 5/2012 | Bromberg et al. | |
| 2012/0193578 | A1 | 8/2012 | Pan et al. | |
| 2012/0257199 | A1 | 10/2012 | Liu et al. | |
| 2012/0261617 | A1 | 10/2012 | Pan et al. | |
| 2012/0325465 | A1 | 12/2012 | Hammer et al. | |
| 2013/0040292 | A1 | 2/2013 | Lopez et al. | |
| 2013/0078469 | A1 | 3/2013 | Winter et al. | |
| 2013/0084643 | A1 | 4/2013 | Commarieu et al. | |
| 2013/0087329 | A1 | 4/2013 | Hewitt et al. | |
| 2013/0109261 | A1 | 5/2013 | Koene | |
| 2013/0244914 | A1 | 9/2013 | Wu et al. | |
| 2013/0259808 | A1 | 10/2013 | Chen et al. | |
| 2013/0296453 | A1 | 11/2013 | Giesenberg et al. | |
| 2013/0312970 | A1 | 11/2013 | Lafitte et al. | |
| 2013/0341030 | A1 | 12/2013 | Brannon et al. | |
| 2014/0060832 | A1 | 3/2014 | Mahoney et al. | |
| 2014/0077121 | A1 | 3/2014 | Sun et al. | |
| 2014/0120627 | A1* | 5/2014 | Rubino ................. | C09K 11/06 252/301.16 |
| 2014/0186939 | A1 | 7/2014 | Peterman et al. | |
| 2014/0190700 | A1 | 7/2014 | Tang et al. | |
| 2014/0231077 | A1 | 8/2014 | Rivero et al. | |
| 2014/0260694 | A1 | 9/2014 | Szlendak | |
| 2014/0323363 | A1 | 10/2014 | Perriat | |
| 2014/0360973 | A1 | 12/2014 | Yin et al. | |
| 2015/0013983 | A1 | 1/2015 | Alwattari | |
| 2015/0038347 | A1 | 2/2015 | Johnson et al. | |
| 2015/0050741 | A1 | 2/2015 | Tour et al. | |
| 2015/0079270 | A1 | 3/2015 | Wang et al. | |
| 2015/0118501 | A1 | 4/2015 | Lu | |
| 2015/0132543 | A1 | 5/2015 | Nouzille et al. | |
| 2015/0159079 | A1 | 6/2015 | Huh et al. | |
| 2015/0232747 | A1 | 8/2015 | Kanj et al. | |
| 2015/0268370 | A1 | 9/2015 | Johnston et al. | |
| 2015/0368547 | A1 | 12/2015 | Lesko et al. | |
| 2015/0376493 | A1 | 12/2015 | Huh et al. | |
| 2016/0003040 | A1 | 1/2016 | Jessheim et al. | |
| 2016/0040514 | A1 | 2/2016 | Rahmani et al. | |
| 2016/0083641 | A1 | 3/2016 | Gamage | |
| 2016/0097750 | A1 | 4/2016 | Van Herzen et al. | |
| 2016/0186044 | A1 | 6/2016 | Rothrock et al. | |
| 2016/0215030 | A1 | 7/2016 | Bressner | |
| 2016/0264846 | A1 | 9/2016 | Bennetzen et al. | |
| 2016/0304934 | A1 | 10/2016 | Matsuno | |
| 2017/0022804 | A1 | 1/2017 | Gupta et al. | |
| 2017/0059668 | A1 | 3/2017 | Chang et al. | |
| 2017/0199124 | A1 | 7/2017 | Bolduc et al. | |
| 2017/0350236 | A1 | 12/2017 | Shen et al. | |
| 2018/0171782 | A1 | 6/2018 | Cox et al. | |
| 2018/0265635 | A1* | 9/2018 | Khamatnurova ........ | C09K 8/68 |
| 2018/0275114 | A1 | 9/2018 | Kosynkin et al. | |
| 2019/0118265 | A1 | 4/2019 | Nie et al. | |
| 2019/0218907 | A1 | 7/2019 | Ow et al. | |
| 2019/0226326 | A1 | 7/2019 | Ow et al. | |
| 2019/0368336 | A1 | 12/2019 | Hammond et al. | |
| 2019/0382648 | A1 | 12/2019 | Murugesan et al. | |
| 2021/0025858 | A1 | 1/2021 | Ow et al. | |
| 2022/0305472 | A1* | 9/2022 | Baker ...................... | B01J 31/26 |
| 2023/0417712 | A1 | 12/2023 | Wang et al. | |

FOREIGN PATENT DOCUMENTS

| | | |
|---|---|---|
| EP | 2040075 | 3/2009 |
| EP | 2480625 | 4/2013 |
| EP | 2480626 | 4/2013 |
| GB | 2489714 | 10/2012 |
| JP | 2005524849 | 8/2005 |
| JP | 2007514169 | 5/2007 |
| JP | 2008505259 | 2/2008 |
| JP | 2008524602 | 7/2008 |
| JP | 2009535060 | 10/2009 |
| JP | 2009540326 | 11/2009 |
| JP | 2015523073 | 8/2015 |
| WO | WO 2010138914 | 12/2010 |
| WO | WO 2011035292 | 3/2011 |
| WO | WO 2011035294 | 3/2011 |
| WO | WO 2011063023 | 5/2011 |
| WO | WO 2012154332 | 11/2012 |
| WO | WO 2012158478 | 11/2012 |
| WO | WO 2013142869 | 9/2013 |
| WO | WO 2014014919 | 1/2014 |
| WO | WO 2014066793 | 5/2014 |
| WO | WO 2014207075 | 12/2014 |
| WO | WO 2015044446 | 4/2015 |
| WO | WO 2015058206 | 4/2015 |
| WO | WO 2015097116 | 7/2015 |
| WO | WO 2015200060 | 12/2015 |
| WO | WO 2016015027 | 1/2016 |
| WO | WO 2016087397 | 6/2016 |
| WO | WO 2017011328 | 1/2017 |
| WO | WO 2017136641 | 8/2017 |
| WO | WO 2017164822 | 9/2017 |

(56) References Cited

FOREIGN PATENT DOCUMENTS

| | | |
|---|---|---|
| WO | WO 2018085504 | 5/2018 |
| WO | WO 2018175763 | 9/2018 |

OTHER PUBLICATIONS

Kaewsaneha et al., "Immobilization of fluorescein isothiocyanate on magnetic polymeric nanoparticle using chitosan as spacer," Journal of Colloid and Interface Science, 2012, 377:145-152, 8 pages.
U.S. Appl. No. 17/454,176, filed Nov. 9, 2021, Wang et al.
U.S. Appl. No. 17/522,437, filed Nov. 9, 2021, Wang et al.
U.S. Appl. No. 17/522,445, filed Nov. 9, 2021, Wang et al.
Agenet et al., "SPE 157019: Fluorescent Nanobeads: a First Step Toward Intelligent Water Tracers" Society of Petroleum Engineers, SPE International Oilfield Nanotechnology conference, Jun. 12-14, 2012, 13 pages.
Anisimov, "SPE 118862: the Use of Tracers for Reservoir Characterization" Society of petroleum Engineers (SPE), presented at SPE Middle East Oil and Gas Show and Conference, Mar. 15-18, 2009, 8 pages.
Armelao et al., "Design of luminescent lanthanide complexes: From molecules to highly efficient photo-emitting materials" Coordination Chemistry Reviews, vol. 254, Mar. 5-6, 2010, 19 pages.
Aslan et al., "Fluorescent Core—Shell AG@$SiO_2$ Nanocomposites for Metal-Enhanced Fluorescence and Single Nanoparticle Sensing Platforms" Jan. 19, 2007, 2 pages.
Badgett et al., "Totalsynthese eines Neobetanidin-Derivates und des Neobetenamins" Helvetica Chimica Acta, 1970, 53(2): 433-448, 16 pages (English Abstract).
Bagaria et al., "Iron Oxide Nanoparticles Grafted with Sulfonated Copolymers are Stable in Concentrated Brine at Elevated Temperatures and Weakly Adsorb on Silica" ACS Applied Materials & Interfaces, vol. 5, No. 8, Mar. 25, 2013, 3329-3339, 11 pages.
Bala et al., "Interaction of Different Metal Ions with Carboxylic Acid Group: a Quantitative Study" The Journal of Physical Chemistry A, vol. 111, No. 28, Jun. 2007, 6183-6190, 8 pages.
Bao et al., "Luminescence properties of the co-luminescence groups of Sm-La-pyridyl carboxylic acids" Journal of Rare Earths, 30(4), Apr. 2012, 320-324, 5 pages.
Blachier et al., "Adsorption of polyamine on clay minerals" Journal of Colloid and Interface Science, 336, Aug. 2009, 599-606, 8 pages.
Borrini et al., "Water Soluble PDCA Derivatives for Selective Ln(III)/An(III) and Am(III)/Cm(III) Separation" Solvent Extraction and Ion Exchange, 33(3), Oct. 2014, 224-235, 30 pages.
Brichart et al., "The Use of Fluorescent Tracers for Inhibitor Concentration Monitoring Useful for Scale Inhibitor" International Petroleum Technology Conference, IPTC-17933-MS, presented at the International Petroleum Technology Conference held in Kuala Lumpur, Malaysia, Dec. 10-12, 2014, 8 pages.
Bunzil et al., "Taking advantage of luminescent lanthanide ions" Chemical Society Reviews, Dec. 2005, 29 pages.
Chang et al., "Magnetic SERS Composite Nanoparticles for Microfluidic Detection" 251st ACE National Meeting, Mar. 13-17, 2016, 1 page.
Chen et al., "Aggregation Kinetics of Alginate-Coated Hematite Nanoparticles in Monovalent and Divalent Electrolytes" Environmental Science & Technology, vol. 40, No. 5, Mar. 2006, 1516-1523, 9 pages.
Chen et al., "Analysis of the solution conformations of T4 lysozyme by paramagnetic NMR spectroscopy" Physical Chemistry Chemical Physics, 2016, 18(8), 5850-5859, 10 pages.
Chen et al., "Impact of Irreversible Retention on Tracer Deployments; Constraining Novel Material Deployments" SPE 188890-MS, in SPE Abu Dhabi International Petroleum Exhibition and Conference, Society of Petroleum Engineers, Nov. 2017, 8 pages.
Chen et al., "Improved Reservoir History Matching and Prudction Optimization with Tracer Data" SPE 191523-MS, in SPE Annual Technical Conference and Exhibition, Society of Petroleum Engineers, Sep. 2018, 15 pages.
Chen et al., "Upconversion Nanoparticles: Design, Nanochemistry, and Applications in Theranostics" Chem. Rev, 114(10), Mar. 2014, 5161-5214, 54 pages.
Chen et al., "FITC functionalized magnetic core-shell $Fe_3O_4$/Ag hybrid nanoparticle for selective determination of molecular biothiols" Elsevier Ltd., Dec. 2013, 7 pages.
Chen et al.; "Hydration Repulsion between Carbohydrate Surfaces Mediated by Temperature and Specific Ions" Scientific Reports, vol. 6, Jun. 23, 2016, 10 pages.
Cheraghian, "Application of nano-particles of clay to improve drilling fluid" Int. J. Nanosci. Nanotechnol., Jun. 13, 2017, 177-186, 10 pages.
Chuang et al., "Ultra-sensitive in-situ detection of novel near-infrared persistent luminescent tracer nanoagents in crude oil-water mixtures" a natureresearch journal, Scientific Reports, Jun. 15, 2016, 5 pages.
Coates et al., "Enhancement of luminescence of europium(m) ions in water by use of synergistic chelation. Part 1.1 : 1 and 2 : 1 complexes" J. Chem. Soc, Perkin Trans., Jan. 1996, 1275-1282, 8 pages.
Cole et al.; "Polyethylene Glycol Modified, Cross-Linked Starch-Coated Iron Oxide Nanoparticles for Enhanced Magnetic tumor Targeting" Biomaterials, vol. 32, No. 8, Mar. 1, 2011, 2183-2193, 11 pages.
Cox et al., "Pyrolyzable Nanoparticle Tracers for Environmental Interrogation and Monitoring" ACS Appl. Mater. Interfaces, 2017, 9(15), 13111-13120, 10 pages.
Cubillos et al., "SPE 174394-MS: the Value of Inter-well and Single Well Tracer Technology for De-Risking and Optimizing a CEOR Process—Caracara Field Case" Society of Petroleum Engineers (SPE), presented at EUROPEC 2015, Jun. 1-4, 2015, 19 pages.
Das et al., "Molecular Fluorescence, Phosphorescence, and Chemiluminescence Spectrometry" Analytical Chemistry, Nov. 3, 2011, 29 pages.
Deans, "SPE 7076: Using Chemical Tracers to Measure Fractional Flow and Saturation In-Situ" Society of Petroleum Engineers (SPE), presented at SPE Symposium on improved Methods of Oil Recovery, Apr. 16-17, 1978, 10 pages.
Deschamps et al., "Drilling to the Extreme: the Micro-Coring Bit Concept" IADC/SPE 115187, presented at the IADC/SPE Asai Pacific Drilling Technology Conference and Exhibition, Aug. 25-27, 2008, 12 pages.
Desmette et al., "Drilling Hard and Abrasive Rock Efficiently, or Generating Quality Cuttings? You No Longer Have to Choose . . . " SPE 116554, Society of Petroleum Engineers, 2008 SPE Annual Technical Conference and Exhibition, Sep. 21-24, 2008, 19 pages.
Du et al., "SPE 93140: Interwell Tracer Tests: Lessons Learnted from past Field Studies" Society of Petroleum Engineers (SPE), presented at SPE Asia Pacific Oil and Gas Conference and Exhibition, Apr. 5-7, 2005, 9 pages.
Dugstad, "Chapter 6: Well-to-well tracer tests" in Petroleum Engineering Handbook, 2007, 651-683, 31 pages.
Dung et al., "Structural and magnetic properties of starch coated magnetite nanoparticles" Journal of Experimental Nanoscience, 4, Sep. 2009, 259-267, 9 pages.
Edwards et al., "Extending the distance range accessed with continuous wave EPR with Gd3+ spin probes at high magnetic fields" Physical Chemistry Chemical Physics, 15(27), 2013, 11313-11326, 14 pages.
El-Aneed et al., "Mass Spectrometry, Review of the Basics: Electrospray, MALDI, and Commonly Used Mass Analyzers" Applied Spectroscopy Reviews, Mar. 16, 2009, 22 pages.
Fichtel et al., "A highly sensitive HPLC method for determination of nanomolar concentrations of dipicolinic acid, a characteristic constituent of bacterial endospores" Journal of Microbiological Methods, 2007, 70, 319-327, 9 pages.
Freeze and Cherry, "Chapter 9: Groundwater Contamination" in Groundwater, Englewood Cliffs, NJ: Prentice-Hall, Inc., 1979, 80 pages.
Galdiga and Greibrokk, "Ultra-trace determination of flurinated aromatic carboxylic acids in aqueous reservoir fluids using solid-

(56) References Cited

OTHER PUBLICATIONS phase extraction in combination with gas chromatography-mass spectrometry" Journal of Chromatography, vol. 793, Issue 2, Apr. 1997, 297-306, 10 pages.
Gao et al., "A Surface Functional Monomer-Directing Strategy for Highly Dense Imprinting of TNT at Surface of Silica Nanoparticles" Journal of American Chemical Society, vol. 129, No. 25, Jun. 2007, 7859-7866, 8 pages.
Gardiner et al., "Practical Raman Spectroscopy" Springer-Verlag, 1989, 9 pages.
Ge et al., "Fluorescence modified chitosan coated magnetic nanoparticles for high-efficienct cellular imaging" Nanoscale Res. Lett, 4, Jan. 2009, 287-295, 9 pages.
George et al., "Modified Dipicolinic Acid Ligands for Sensitation and Europium (III) Luminescence" Inorganic Chemistry, vol. 45, No. 4, Feb. 1, 2006, 6 pages.
Georgi, et al., "Advances in Cuttings Collection and Analysis" SPWLA 34th Annual Logging Symposium, Jun. 13-16, 1993, 20 pages.
Gordon-Grossman et al., "W-Band pulse EPR distance measurements in peptides using Gd3+-dipicolinic acid derivatives as spin labels" Physical Chemistry Chemical Physics, 13(22), 2011, 10771-10780, 10 pages.
Grutzke et al., "Heptacoordinate Heteroleptic Salan (ONNO) and Thiosalan (OSSO) Titanium(IV) Complexes: Investigation of Stability and Cytotoxicity" Inorganic Chemistry 54(14), Jul. 2015, 6697-6706, 10 pages.
Hagoot, "The response of interwell tracer tests in watered-out reservoirs" SPE 11131-MS, in SPE Annual Technical Conference and Exhibition, Society of Petroleum Engineers, Jan. 1982, 21 pages.
Han et al., "Application of Silver-Coated Magnetic Microspheres to a SERS-Based Optofluidic Sensor" The Journal of Physical Chemistry (JPCC), Mar. 7, 2011, 7 pages.
Hardy et al., "A novel fluorescent tracer for real-time tracing of clay transport over soil surfaces" Catena, 141, Jun. 2016, 39-45, 7 pages.
He et al., "Luminescent Europium Chelates Synthesis and Fluorescence Properties" Sensors and Materials (2007), 19(2), 123-132, 10 pages.
Hindle et al., "Dipicolinic acid (DPA) assay revisited and appraised for spore detection" Analyst, 1999, 124: 1599-1604, 6 pages.
Hu et al., "Smart Liquid SERS Substrates based on $Fe_3O_4$/Au Nanoparticles with Reversibility Tunable Enhancement Factor for Practical Quantitative Detection" a natureresearch journal, Scientific Reports, Nov. 27, 2014, 10 pages.
Huseby et al., "Assessing EOR potential from partitioning tracer data" SPE 172808-MS, in SPE Middle East Oil and Gas Show and Conference, Society of Petroleum Engineers, Mar. 2015, 15 pages.
Huseby et al., "SPE-169183-MS: High Quality Flow Information from Tracer Data" Society of Petroleum Engineers (SPE), presented at the SPE Bergen One Day Seminar, Apr. 2, 2014, 9 pages.
Hutchins et al., "SPE-21049: Aqueous Tracers for Oilfield Applications" Society of Petroleum Engineers (SPE), presented at SPE International Symposium on Oilfield Chemistry, Feb. 20-22, 1991, 9 pages.
Invitrogen, "Fluorophores and Their Amine-Reactive Derivatives" Molecular Probs Handbook, a Guide to Fluorescent Probes and Labeling Technologies, 11th Edition, 2010, 88 pages.
Jenkins et al., "Ultratrace Determination of Selected Lanthanides by Luminescence Enhancement" Analytical Chemistry, vol. 68, No. 17, Jan. 1, 1996, 7 pages.
Jun et al., "Multifunctional Silver-Embedded Magnetic Nanoparticles as SERS Nanoprobes and Their Applications" Wiley-VCH Verlag Gmbh& Co. KGaA, Weinheim, Jan. 4, 2010, 7 pages.
Kaushik et al., "Gd(III) and Mn(II) complexes for dynamic nuclear polarization: small molecular chelate polarizing agents and applications with site-directed spin labeling of proteins" Physical Chemistry Chemical Physics, 18(39), 2016, 27205-27218, 36 pages.
Khan et al., "Optimizing waterflood management in a giant UAE carbonate oil field using simulation-based streamlines" SPE 171777-MS, in Abu Dhabi International Petroleum Exhibition and Conference, Society of Petroleum Engineers, Nov. 10-13, 2014, 9 pages.
Kneipp et al., "Single Molecule Detection Using Surface-Enhanced Raman Scattering (SERS)" Physical Review Letters, American Physical Society vol. 78, No. 9, Mar. 3, 1997, 4 pages.
Kornberger and Thiele, "Experiences with an Efficient Rate-Management Approach for the 8th Tortonian Reservoir in the Vienna Basin" SPE 166393-PA, SPE Reservoir Evaluation and Engineering, vol. 17, No. 2, May 2014, 12 pages.
Kosynkin and Alaskar, "Oil Industry First Interwell Trial of Reservoir Nanoagent Tracers" SPE 181551-MS, in SPE Annual Technical Conference and Exhibition, Society of Petroleum Engineers, Sep. 2016, 15 pages.
Kramer, "Water-Soluble Dendritic Architectures with Carbohydrate Shells for the Templation and Stabilization of Catalytically Active Metal Nanoparticles" published by ACS, Macromolecules, vol. 38, No. 20, Aug. 27, 2005, 8308-8315, 8 pages.
Labbe et al., "Development of metal-chelating inhibitors for the Class II fructose 1,6-bisphosphate (FBP) aldolase" Journal of Inorganic Biochemistry, 112, Jul. 2012, 49-58, 10 pages.
Lachowicz et al., "Biocompatible and fluorescent superparamagnetic iron oxide nanoparticles with superior magnetic properties coates with charged polysaccharide derivatives" Colloids and Surfaces B: Biointerfaces, 2017, 150, 402-407, 18 pages.
Larsen et al., "Efficient Synthesis of 4,7-Diamino Substituted 1,10-Phenanthroline-2,9-dicarboxamides" Organic Letters, vol. 13, No. 13, Jul. 2011, 3546-3548, 3 pages.
Li et al., "Long persistent phosphors—from fundamentals to applications" Chem. Soc. Rev., 45(8), Apr. 2016, 2090-2136, 48 pages.
Li et al., "Magic Angle Spinning NMR Structure Determination of Proteins from Pseudocontact Shifts" Journal of the American Chemical Society, 135(22), May 2013, 8294-8303, 10 pages.
Li et al., "Superparamagnetic Iron Oxide Nanoparticles as MRI contrast agents for Non-invasive Stem Cell Labeling and Tracking" Theranostics, Jul. 2013, 3(8):595-615, 21 pages.
Li et al., "Thiol-ene reaction: a versatile tool in site-specific labelling of proteins with chemically inert tags for paramagnetic NMR" Chemical Communications, Cambridge, United Kingdom, 48(21), 2704-2706, 2012, 18 pages.
Liu et al., "Photostimulated near-infrared persistent luminescence as a new optical read-out from Cr3+-doped LiGa5O8" Scientific Reports 3, Article 1554, Mar. 2013, 9 pages.
Lomstein and Jorgensen, "Pre-column liquid chromatographic determination of dipicolinic acid from bacterial endospores" Limnology and Oceanography: Methods, Apr. 2012, 10:4, 227-233, 14 pages.
Mahdavi et al., "Preparation, Characterization, and Application of Polyacrylamide-Polystyrene/Bentonite Nanocomposite as an Effective Immobilizing Adsorbent for Remediation of Soil" Chemistry Select, Apr. 5, 2020, 4538-4547, 12 pages.
Mahmoudi et al., "Superparamagnetic iron oxide nanoparticles development surface modification and applications in chemotherapy" Advanced Drug Delivery Reviews, Jan. 2011, 63, 24-46, 23 pages.
Manna et al, "Complexation behavior of trivalent actinides and lanthanides with 1,10-phenanthroline-2,9-dicarboxylic acid based ligands: insight from density functional theory" Physical Chemistry Chemical Physics, vol. 14, No. 31, Jan. 2012, 11060-11069, 10 pages.
Marais, A., et al. "Time-Resolved Fluorescence for Real-Time Monitoring of Both Scale and Corrosion Inhibitors: a Game-Changing Technique" SPE International Oilfield Scale Conference and Exhibition. OnePetro, May 2016, 11 pages.
Marchetti et al., "Fluorous affinity chromatography for enrichment and determination of perfluoroalkyl substances" Annual Review of Analytical Chemistry vol. 84, Jul. 19, 2012, 8 pages.
Martinez et al., "Polysaccharide-based Nanoparticles for Controlled Release Formulations" The Delivery of Nanoparticles, Published May 2012, 185-222, 40 pages.
Martini et al., "How to Monitor Scale Inhibitor Squeeze using Simple TRF Tracers" Society of Petroleum Engineers, presented at the SPE International Symposium on Oilfield Chemistry held in the Woodlands, Texas, Apr. 13-15, 2015, 8 pages.

(56) References Cited

OTHER PUBLICATIONS

Melton et al, "Complexes of Greatly Enhanced Thermodynamic Stability and Metal Ion Size-Based Selectivity, Formed by the Highly Preorganized Non-Macrocyclic Ligand 1,10-Phenanthroline-2,9-dicarboxylic Acid: a Thermodynamic and Crystallographic Study" Inorganic Chemistry vol. 45 No. 23, Jun. 2006, 9 pages.
Moyner et al., "The Application of Flow Diagnostics for Reservoir Management" Society of Petroleum Engineers (SPE), Apr. 2015, 18 pages.
Muller and Seubert, "Ultra trace determination of fluorobenzoic acids in tap and reservoir water using solid-phase extraction and gas chromatography-mass spectrometry" Journal of Chromatography A, 1260, Oct. 2012, 7 pages.
Nie et al., "Probing Single Molecules and Single Nanoparticles by Surface-Enhanced Raman Scattering" Science, vol. 275, No. 5303, Feb. 1997, 1102-1106, 6 pages.
Ogden et al, "Complexation of Am(III) and Nd(in) by 1,10-Phenanthroli ne-2,9-Di carboxylic Acid" Journal of Solution Chemistry, vol. 42, No. 1, pp. 211-225, 2013, 15 pages.
Ouali et al., "Analysis of Paramagnetic NMR Spectra of Triple-Helical Lanthanide Complexes with 2,6-Dipicolinic Acid Revisited: a New Assignment of Structural Changes and Crystal-Field Effects 25 Years Later" Inorganic Chemistry, 41(6), Feb. 2002, 1436-1445, 10 pages.
Pallenberg et al. "Synthesis and Characterization of Some Copper(I) Phenanthroline Complexes" Inorg. Chem. 1995, 34, 2833-2840, 8 pages.
Park et al., "Application of montmorillonite in bentonite as a pharmaceutical excipient in drug delivery systems" Journal of Pharmaceutical Investigation, 46, May 2016, 363-375, 13 pages.
Parker and Williams, "Getting excited about lanthanide complexation chemistry" Journal of the Chemical Society, Dalton Transactions, vol. 18, 1996, 16 pages.
Parker et al., "Being excited by lanthanide coordination complexes: aqua species, chirality, excited-state chemistry, and exchange dynamics" Chemical Reviews, vol. 102, Issue 6, May 2002, 34 pages.
Petoud et al., "Brilliant SM, Eu, Tb, and Dy Chiral Lanthanide Complexes with Strong Circularly Polarized Luminescence" Journal fo the American Chemical Society (JACS), Dec. 15, 2006, 7 pages.
Potapov et al., "Nanometer-Scale Distance Measurements in Proteins Using Gd3+ Spin Labeling" Journal of the American Chemical Society, 132(26), Jun. 2010, 9040-9048, 9 pages.
Qianming et al., "Bspda Synthesis and its Europium (III) Complexes' Fluorescence" Chemical Industry Times, Jul. 2005, 19(7): 38-41, 4 pages (English Abstract).
Rashdan et al., "Effect of the preparation route, PEG and annealing on the phase stability of Fe3O4 nanoparticles and their magnetic properties" Journal of Experimental Nanoscience, vol. 8, No. 2, 2013, 210-222, 13 pages.
Rovani, "Enhanced Oil Recovery: Aqueous Flow Tracer Measurement" WRI-09-R002, OSTI.Gov, Technical Report, U.S. Department of Energy, Feb. 2009, 1-18, 25 pages.
Rowan et al., "Dynamic Covalent Chemistry" Angewante Chemie International Edition, Mar. 15, 2002, 55 pages.
Sabbatini et al., "Luminescent lanthanide complexes as photochemical supramolecular devices" Coordination Chemistry Reviews, vol. 123, issue 1-2, Feb. 1993, 28 pages.
Saeki et al., "Upper and lower critical solution temperatures in poly (ethylene glycol) solutions" POLYMER, vol. 17, No. 8, Aug. 1976, 685-689, 5 pages.
Sammes and Yshioglu, "Modern bioassays using metal chelates as luminescent probes" Natural Product Reports, vol. 31, No. 1, 1996, 28 pages.
Sanni et al., "A field case study of inter-well chemical tracer test" in SPE International Symposium on Oilfield Chemistry, Society of Petroleum Engineers, Apr. 2015, 17 pages.
Sanni et al., "Pushing the envelope of residual oil measurement: a field case study of a new class of inter-well chemical tracers" Journal of Petroleum Science and Engineering, vol. 163, 2018, 19 pages.
Santarelli et al., "Formation Evaluation From Logging on Cuttings" SPE Reservoir Evaluation and Engineering, presented at the 1996 SPE Permian Basin Oil and Gas Recovery Conference, Mar. 27-29, 1996, published Jun. 1998, 7 pages.
Schmidt et al., "Copper dipicolinates as peptidomimetic ligands for the Src SH2 domain" Bioorganic & Medicinal Chemistry Letters, 14(16), 4203-4206, Aug. 2004, 4 pages.
Schmidt et al., "Synthesis of Mono- and Dinuclear Vanadium Complexes and Their Reactivity toward Dehydroperoxidation of Alkyl Hydroperoxides" Inorganic Chemistry 56(3), 2017, 1319-1332, 14 pages.
Selvin et al., "Principles and biophysical applications of lanthanide-based probes" Annual Review of Biophysics and Biomolecular Structure, Jun. 2002, 28 pages.
Serres-Piole et al., "Direct sensitive simultaneous determination of fluorinated benzoic acids in oil reservoir waters by ultra high-performance liquid chromatography-tandem mass spectrometry" Journal of Chromatography A, 1218, Aug. 2011, 6 pages.
Serres-Piole et al., "Water tracers in oilfield applications: Guidelines" Elsevier Ltd., Journal of Science and Engineering, Nov. 2012, 18 pages.
ShamsiJazeyi et al., "Polymer-Coated Nanoparticles for Enhance Oil Recovery" Journal of Applied Polymer Science, vol. 131, No. 15, Aug. 5, 2014, 13 pages.
Shook et al., "SPE 124614: Determining Reservoir Properties and Flood Performance from Tracer Test Analysis" Society of petroleum Engineers (SPE), presented at SPE Annual Technical Conference and Exhibition, Oct. 4-7, 2009, 19 pages.
Solomon et al., "Synthesis and Study of Silver Nanoparticles" Journal of Chemical Education vol. 84, No. 2, 2007, 332-325, 4 pages.
Song et al., "SERS-Encoded Nanogapped Plasmonic Nanoparticles: Growth of Metallic Nanoshell by Templating Redox-Active Polymer Brushes" Journal of the American Chemical Society (JACS), Apr. 28, 2014, 4 pages.
Stiles et al., "Surface-Enhanced Raman Spectroscopy" Annual Review of Analytical Chemistry, vol. 1, No. 1, Jul. 2008, 601-626, 29 pages.
Stryer et al., "Diffusion-enhanced fluorescence energy transfer" Annual Review of Biophysics and bioengineering, vol. 11, Issue 1, 1982, 21 pages.
Su et al., "A Dipicolinic Acid Tag for Rigid Lanthanide Tagging of Proteins and Paramagnetic NMR Spectroscopy" Journal of the American Chemical Society, 130(32), Jul. 2008, 10486-10487, 2 pages.
Tang et al., "Synthesis and fluorescence properties of Tb(III) complexes with pyridine-2,6-dicarboxylic acid derivatives" Journal of Central South University of Technology (English Edition), 15(5), Oct. 2008, 599-605, 7 pages.
Tang et al., "Synthesis of Novel Derivatives of Pyridine-2,6-dicarboxylic Acid" Synthetic Communications: an International Journal for Rapid Communication of Synthetic Organic Chemistry, 36(14), Jun. 2006, 2027-2034, 9 pages.
Tang et al., "Synthesis of Eu(III) and Tb(III) Complexes with Novel Pyridine-2,6-Dicarboxylic Acid Derivatives and Their Fluorescence Properties" Front. Chem. China, 2006, 4:, 408-413, 6 pages.
Thomas et al., "Deployment and Detection of a Novel Barcoded Advanced Tracers System for the Optimization of Improved Waterflood Recovery in Hydrocarbon Reservoirs" SPE-194872-MS, SPE Middle East Oil and Gas Show and Conference. Society of Petroleum Engineers, 2019, 10 pages.
Tian et al., "Off-Resonant Gold Superstructures as Ultrabright Minimally Invasive Surface-Enhanced Raman Scattering (SERS) Probes" American Chemical Society, Jul. 2015, 7 pages.
Toulhoat, "Experimentation and Modelling of U, Th and Lanthanides Transport in Fissured Rocks: Influence of Complexation" MRS Proceedings, vol. 50, Jan. 1, 1985, 8 pages.

(56) References Cited

OTHER PUBLICATIONS

Wahajuddin et al., "Superparamagnetic iron oxide nanoparticles: Magnetic nanoplatforms as drug carriers" International Journal of Nanomedicine, 7, Jul. 2012, 3445-3471, 27 pages.
Wang et al., "The Design and Implementation of a Full Field Inter-Well Tracer Program on a Giant UAE Carbonate Oil Field" in Abu Dhabi International Petroleum Exhibition and Conference, Society of Petroleum Engineers, SPE-177527-MS, Nov. 2015, 8 pages.
Wu et al., "A reusable biosensor chip for SERS-fluorescence dual mode immunoassay" Proc. SPIE 9543, Third International Symposium on Laser Interaction with Matter, 954317, May 4, 2015, 6 pages.
Wu et al., "A SERS-Assisted 3D Barcode Chip for High-Throughput Biosensing" Small Journal vol. 11, No. 23, Jun. 11, 2015, 9 pages.
Xu et al., "Superparamagnetic Photonic Crystals" Adv. Mater., Nov. 2001, 13, 1681-1683, 4 pages.
Xu et al., "Synthesis and Utilization of Monodisperse Superparamagnetic Colloidal Particles for Magnetically Controllable Photonic Crystals" Chem. Mater., 14(3), 2002, 1249-1256, 8 pages.
Xu et al.., "Measurement of two-photon excitation cross sections of molecular fluorophores with data from 690 to 1050 nm" Journal of the Optical Society of America B, Mar. 1996, 11 pages.
Yang et al., "The Co-Luminescence Groups of Sm-La-pyridyl Carboxylic Acids and the Binding Characteristics between the Selected Doped Complex and Bovine Serum Albumin" Bulletin of the Korean Chemical Society 33(4), Apr. 20, 2012, 1303-1309, 7 pages.
Yang et al., "Paramagnetic labeling of proteins and pseudocontact shift in structural biology" Chinese Journal of Magnetic Resonance, 2014, 31(2):155-171, 12 pages (English Abstract).
Yu et al., "Adsorption of proteins and nucleic acids on clay minerals and their interactions: a review" Applied Clay Science, 80-81, Aug. 2013, 443-452, 10 pages.
Zamberi et al., "SPE 166005: Improved Reservoir Surveillance Through Injected Tracers in a Saudi Arabian Field: Case Study" Society of Petroleum Engineers (SPE), presented at SPE Reservoir Characterization and Simulation Conference and Exhibition, Sep. 2013, 15 pages.
Zemel, "Chapter 3: Interwell Water Tracers" Tracers in the Oil Field, vol. 43, 1st Edition, Elsevier Science, Jan. 13, 1995, 47 pages.
Zhang et al., "Water adsorption on kaolinite and illite after polyamine adsorption" Journal of Petroleum Science and Engineering, 142, Jun. 2016, 13-20, 8 pages.
Zhao et al., "Chromatographic Separation of Highly Soluble Diamond Nanoparticles Prepared by Polyglycerol Grafting" Angewandte Chemie International Edition, vol. 50, No. 6, Feb. 7, 2011, 1388-1392, 5 pages.
Zhou et al., "Upconversion luminescent materials: advances and applications" Chem Rev., Jan. 14, 2015, 71 pages.

* cited by examiner

FIG. 6

R
O
O
O
O
+
H
NRR_{ii}
R
O
NRR_{ii}
+
HO
O
O

(R: FITC, RBITC; R': $-C_5H_6=CH_2$, $-(CH_2)_n=CH_2$)

Peroxide

MULTIFUNCTIONAL FLUORESCENT POLYMER-CLAY COMPOSITE TRACERS

TECHNICAL FIELD

This document relates to methods and compositions used in tagging and tracing subterranean cuttings produced during drilling.

BACKGROUND

Subterranean cuttings that are produced during drilling operations can provide critical information, for example, the lithology and mineral composition of the subterranean formation. However, cuttings produced at the drill head travel to the surface via the annulus, and it is difficult to accurately determine or even estimate lag time during this upward trip. This makes analyzing the depth at which these cutting originated difficult.

Mud tracers can be used to determine mud cycle time, for example, the circulation time, however, the estimating the depth of cuttings based on circulation time is inaccurate, especially if the wellbore includes long horizontal sections or the return trip time is lengthy. For example, when the return trip is longer than half an hour, it is common to have depth uncertainties of more than 6 meters (20 feet). This, in turn, compounds errors in characterizing the formation according to the depth of the cuttings. More efficient mud tracer materials and rapid detection techniques for these tracers are highly desirable.

SUMMARY

This disclosure describes compositions and methods that can be used to determine the origin depth of a wellbore cutting.

In some implementations, a polymer-clay composite tag includes a nanoclay. The nanoclay includes a plurality of layers, and a polymer intercalated between the layers of the nanoclay. The polymer is functionalized with a fluorescent dye.

In some implementations, a method of synthesizing a polymer-clay composite includes functionalizing a polymer with a fluorescent dye to yield a fluorescent polymer and intercalating the fluorescent polymer in a nanoclay.

In some implementations, a method of synthesizing a polymer-clay composite includes intercalating styrene-based monomers or acrylate-based monomers and a fluorescent dye between the layers of a nanoclay and inducing radical polymerization to polymerize the styrene-based monomers and fluorescent dye or acrylate-based monomers and fluorescent dye to yield a fluorescent polymer-clay composite.

In some implementations, a method of determining the origin location of a subterranean sample includes mixing a polymer-clay composite tag into a fluid. The polymer-clay composite tag includes a nanoclay. The nanoclay includes layers and a fluorescent polymer intercalated between the layers of the nanoclay. The method includes flowing the fluid through a work string into a subterranean formation, recovering subterranean samples from the subterranean formation, and determining the origin location of the subterranean sample by detecting the presence of the polymer-clay composite tag.

The details of one or more implementations of the disclosure are set forth in the accompanying drawings and the description that follows. Other features, objects, and advantages of the disclosure will be apparent from the description and drawings, and from the claims.

DESCRIPTION OF DRAWINGS

FIG. 6 shows an example reaction of isothiocyanate with a primary or secondary amine to yield a substituted thiourea.

FIG. 7 shows an example reaction between an NHS ester and a primary or secondary amine.

FIG. 8 shows an example reaction between an isothiocyanate containing dye and a reactant that includes a primary amine and an allyl group to yield an allyl-containing fluorescent dye.

FIG. 9 shows an example reaction between an isothiocyanate containing fluorescent dye and 3-buten-1-amine to yield an allyl-containing fluorescent dye.

FIG. 10 shows an example reaction of an allyl-containing fluorescent dye with a styrene monomer, where peroxide-induced polymerization yields a fluorescent styrene-based polymer.

Like reference symbols in the various drawings indicate like elements.

DETAILED DESCRIPTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Figure 1:
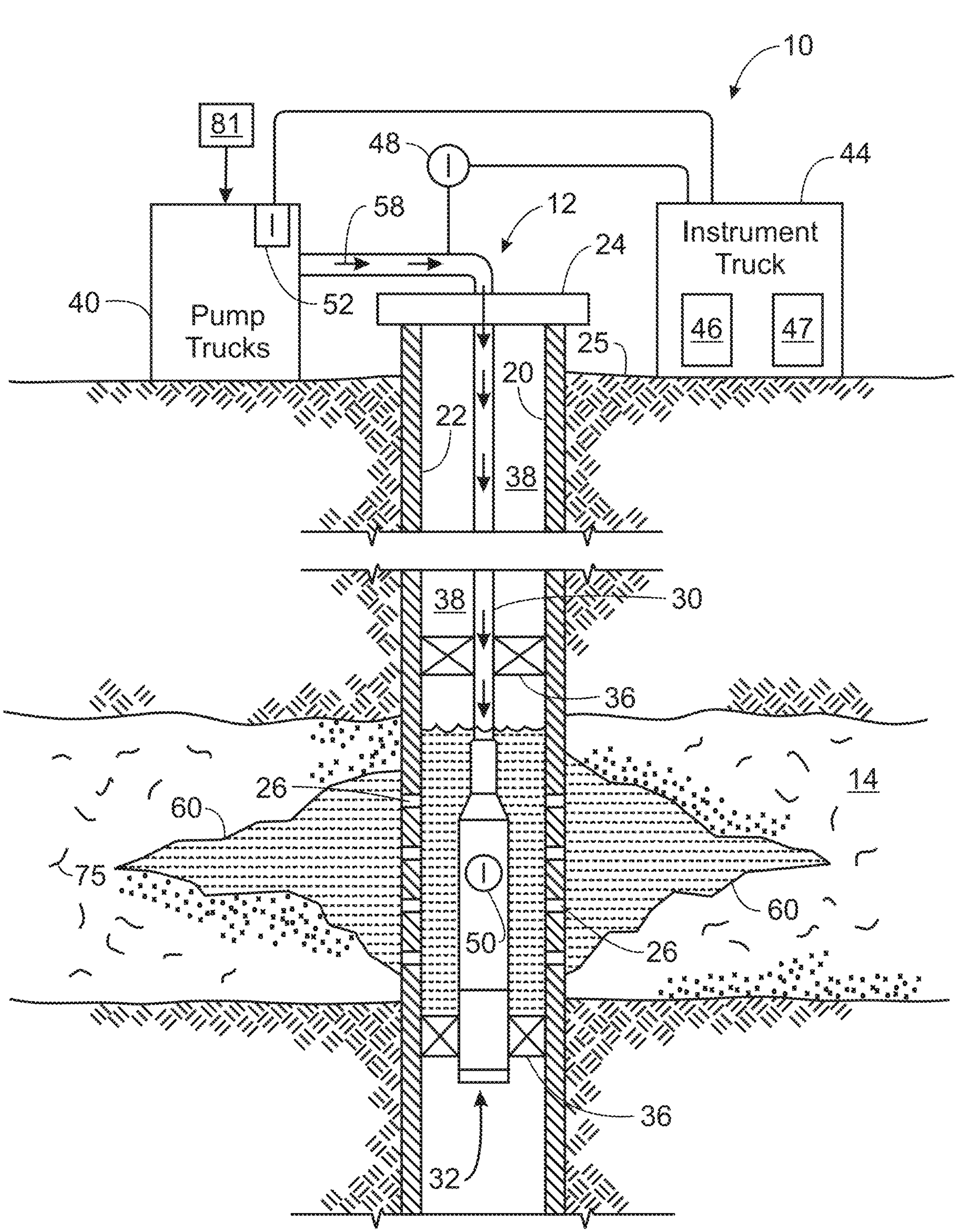
FIG. 1 shows an example schematic of a drilling operation 10 for a well 12.

Provided in this disclosure, in part, are methods, compositions, and systems for accurately determining the origin depth or location of cuttings produced during drilling. FIG. 1 illustrates an example of a drilling operation 10 for a well 12. The well 12 can be in a wellbore 20 formed in a subterranean zone 14 of a geological formation in the Earth's crust. The subterranean zone 14 can include, for example, a formation, a portion of a formation, or multiple formations in a hydrocarbon-bearing reservoir from which recovery operations can be practiced to recover trapped hydrocarbons. Examples of unconventional reservoirs include tight-gas sands, gas and oil shales, coalbed methane, heavy oil and tar sands, gas-hydrate deposits, to name a few. In some implementations, the subterranean zone 14 includes an underground formation including natural fractures 60 in rock formations containing hydrocarbons (for example, oil, gas, or both). For example, the subterranean zone 14 can include a fractured shale. In some implementations, the well 12 can intersect other suitable types of formations, including reservoirs that are not naturally fractured in any significant amount.

The well 12 can include a casing 22 and well head 24. The wellbore 20 can be a vertical, horizontal, deviated, or multilateral bore. The casing 22 can be cemented or otherwise suitably secured in the wellbore 20. Perforations 26 can be formed in the casing 22 at the level of the subterranean zone 14 to allow oil, gas, and by-products to flow into the well 12 and be produced to the surface 25. Perforations 26 can be formed using shape charges, a perforating gun, or otherwise.

For a drilling treatment 10, a work string 30 can be disposed in the wellbore 20. The work string 30 can be coiled tubing, sectioned pipe, or other suitable tubing. A drilling tool or drill bit 32 can be coupled to an end of the work string 30. Packers 36 can seal an annulus 38 of the wellbore 20 uphole of and downhole of the subterranean zone 14. Packers 36 can be mechanical, fluid inflatable, or other suitable packers.

One or more pump trucks 40 can be coupled to the work string 30 at the surface 25. The pump trucks 40 pump drilling mud 58 down the work string 30 to lubricate and cool the drilling tool or drill bit 32, maintain hydrostatic pressure in the wellbore, and carry subterranean cuttings to the surface. The drilling mud 58 can include a fluid pad, proppants, flush fluid, or a combination of these components. The pump trucks 40 can include mobile vehicles, equipment such as skids, or other suitable structures.

One or more instrument trucks 44 can also be provided at the surface 25. The instrument truck 44 can include a drilling control system 46 and a drilling simulator 47. The drilling control system 46 monitors and controls the drilling treatment 10. The drilling control system 46 can control the pump trucks 40 and fluid valves to stop and start the drilling treatment 10. The drilling control system 46 communicates with surface and subsurface instruments to monitor and control the drilling treatment 10. In some implementations, the surface and subsurface instruments may comprise surface sensors 48, down-hole sensors 50, and pump controls 52.

Additives 81 can be mixed with drilling mud 58 and flowed through the reservoir. In some implementations, the additives are tags that can embed into or decorate the surface of cuttings produced by the drill bit. For example, the additives can have high affinity non-specific binding onto cutting surfaces as a result of physico-chemical and/or ionic forces, for example, Van der Waals, hydrophobic/hydrophilic interactions, and oppositely charged surfaces. When drilling mud is introduced into the subterranean formation via the drill bit, tags that are included in the mud will contact the subterranean formation for the first time at the drill head. If the depth or relative position of the drill head and the lag time of the mud in the drill string are known, cuttings that are tagged with a specific tag can be accurately assigned an origin depth or position. Accordingly, the origin location of the cutting can be accurately determined.

In some implementations, more than one tag can be used. The tags can be uniquely identifiable. Accordingly, cuttings that include or are decorated with a first tag can be assigned to a first depth or position, and cuttings that include or are decorated with a second tag can be assigned to a second depth or position. The number of tags is not limited to two, and the tags can uniquely identify a third, fourth, fifth, etc. depth or position.

The tags described herein are multi-modal tags, meaning that each tag includes a unique combination of features that can be orthogonally detected. Accordingly, the variations in the features of the tags can act as a uniquely identifiable "barcode" or "fingerprint." In addition, the combination of orthogonally detectable features expands the number of uniquely identifiable tags that can be produced.

The tags described herein include nanoclays. The nanoclays are nanoparticles or micro-sized particles with nanoscale layered mineral silicates, for example, bentonite, illite, and kaolinite. The nanoclays have similar density and surface properties as the clays typically used in drilling mud formulations. Accordingly, the tags described herein can travel well with the clays in the drilling mud, and contact subterranean cuttings at the drill bit. The tags are small, with a total size less than about 25 μm. Therefore, the tags can embed into the pores of cuttings at real time during drilling, accurately tagging the cuttings, and allowing the origin location of the cuttings to be determined.

In addition, the tags described herein can be rapidly detected with high sensitivity. In some implementations, the tags can be detected at the drilling site, making detection more rapid and allowing the drill operators to make drilling decisions based on real-time data.

Another advantage of the tags described herein is that they can be identified in two stages. In a rapid stage, a first analysis can be conducted quickly at the drilling site using a first procedure. This allows for the easy separation of tagged materials from untagged materials. After the rapid stage, the tagged materials can be subjected to a second analysis, either off-site or on-site. Accordingly, the multi-stage approach includes a first analysis that acts as a screening process. The screening process reduces the number of cuttings that need to be transported and subsequently analyzed. This approach saves time, labor, and laboratory costs. In addition, this multi-modal identification allows for rapid identification and real-time analysis that can aid in drilling operations. For example, the knowledge that a certain type of cutting is produced at a certain location can influence subsequent drilling decisions.

The tags described herein include clay. Clay is a major component of water-based drilling muds. The most commonly used drilling mud clays include bentonite, illite, and kaolinite. These clays have layered structures and can swell in water. The layered structures give the clays a very large total surface area, and the surfaces of the layers in the clays are highly charged and can serve as super-absorbent surfaces for guest molecules under specific conditions. For example, as a swelling clay, sodium montmorillonite, a predominant component of bentonite, has strong swelling capacity and can expand its original volume by up to a factor of eight. Within the layered structure of sodium montmorillonite, the negatively charged surfaces of the montmorillonite sheets are charged-balanced by exchangeable ionic species. For example, cationic compounds can be adsorbed onto montmorillonite via electrostatic interactions.

Organic compounds may also adsorb onto the clay through other interactions, including hydrogen bonding and van der Waals forces. This adsorptive property is pH dependent. The electric surface properties of clay minerals vary with the pH of the surrounding solution. In more detail, the surface of these clays contains ionizable aluminol groups (AlOH) that have amphoteric behavior, i.e., can take up either a proton or a hydroxyl ($OH^-$) group depending on the isoelectric point (IEP) of the clay and the pH of the surrounding solution. This property is illustrated by Equations 1-3.

$$\equiv \text{Clay} - \text{AlOH} + \text{H}^+ \rightarrow \text{Clay}-\text{Al}-\text{OH}_2^+ \text{ (at pH} < IEP) \quad \text{Eq. 1}$$

$$\equiv \text{Clay} - \text{AlOH}_2^+ + 2\text{OH}^- \rightarrow \equiv \text{Clay} - \text{AlO}^- + 2\text{H}_2\text{O} \text{ (at pH} = IEP) \quad \text{Eq. 2}$$

$$\equiv \text{Clay} - \text{AlOH} + 2\text{OH}^- \rightarrow \equiv \text{Clay} - \text{AlO}^- + \text{H}_2\text{O} \text{ (at pH} > IEP) \quad \text{Eq. 3}$$

Figure 2:
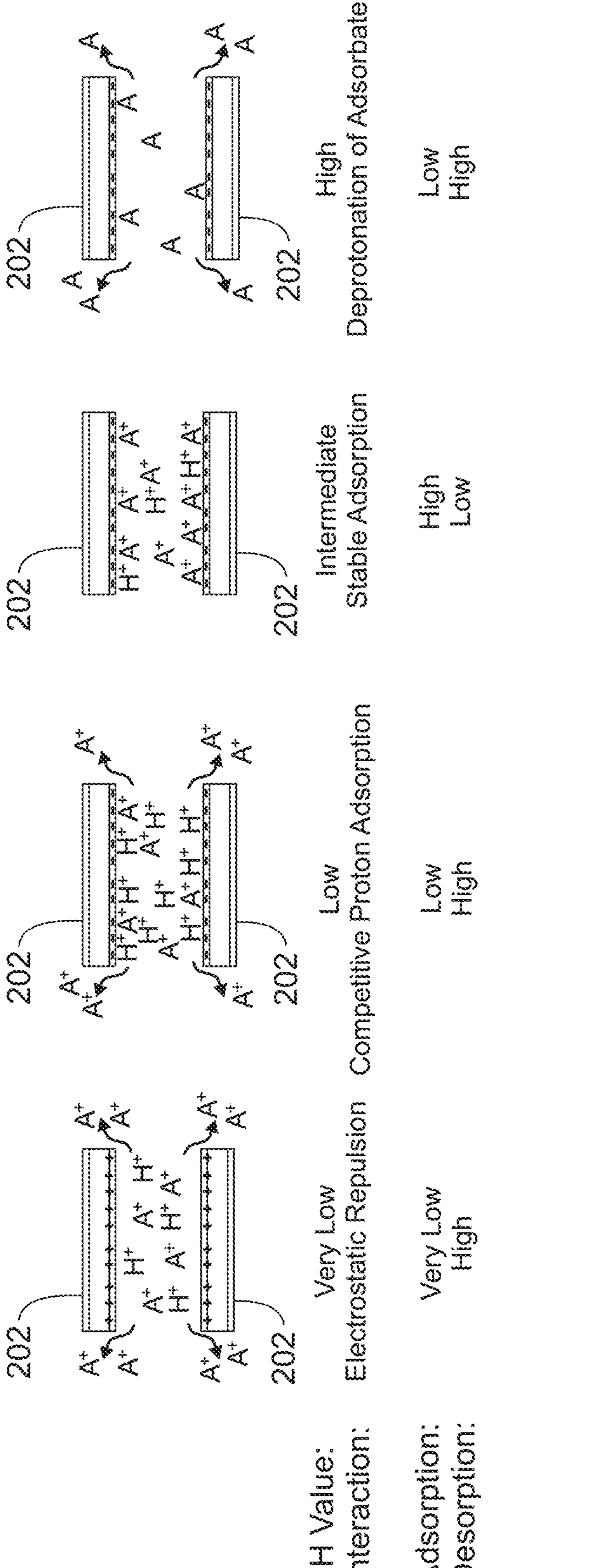
FIG. 2 shows an example schematic of the effect of pH on cationic adsorption on the surface of clay layers.

When the pH is less than the isoelectric point of the clay, the surface charge of the clay is positive. When the pH is greater than the isoelectric point of the clay, the surface charge is negative. Accordingly, the pH of a surrounding solution can be manipulated to selectively adsorb or desorb guest cationic species. FIG. 2 shows an example schematic of the effect of pH on cationic adsorption on the surface of clay layers 202, where $H^+$ represents a proton in aqueous solution and $A^+$ represents a guest cationic species. When the pH is equal to the isoelectric point, the net charge is zero. At low pH conditions, i.e., below the isoelectric point, there is electrostatic repulsion between the positively charged clay surfaces and the anionic species in solution. As the pH increases, the surfaces of the clay become negatively charged and there is competitive adsorption of the protons and guest cationic species. At intermediate pH values, the guest cationic species is stably adsorbed to the clay surfaces. At high pH values, the cationic guest species disassociates from the clay surfaces. Accordingly, these clays can serve as controlled release vehicles. Presented herein are methods to incorporate polymers and cationic polymers into clay nanoparticles, for example, bentonite nanoparticles, to yield functionalized nanoclays.

In some implementations, the functionalized nanoclays are a fluorescent polymer-clay composite that can be used in subterranean applications. The composite includes a fluorescent moiety and a polymer network intercalated into a nanoclay. The fluorescent and polymer components offer fingerprint-like identification and can be detected by multiple orthogonal analytical methods. This means that composites that include unique combinations of fluorescent and polymer components can be uniquely identified and differentiated from one another.

Presented herein are multiple synthetic routes for synthesizing fluorescent polymer-clay composites. In some implementations, a fluorescent dye is chemically grafted to a polymer network to yield a fluorescent polymer network. The fluorescent polymer network is inserted into the layers of the clay to form a stable sandwich structure.

Figure 3:
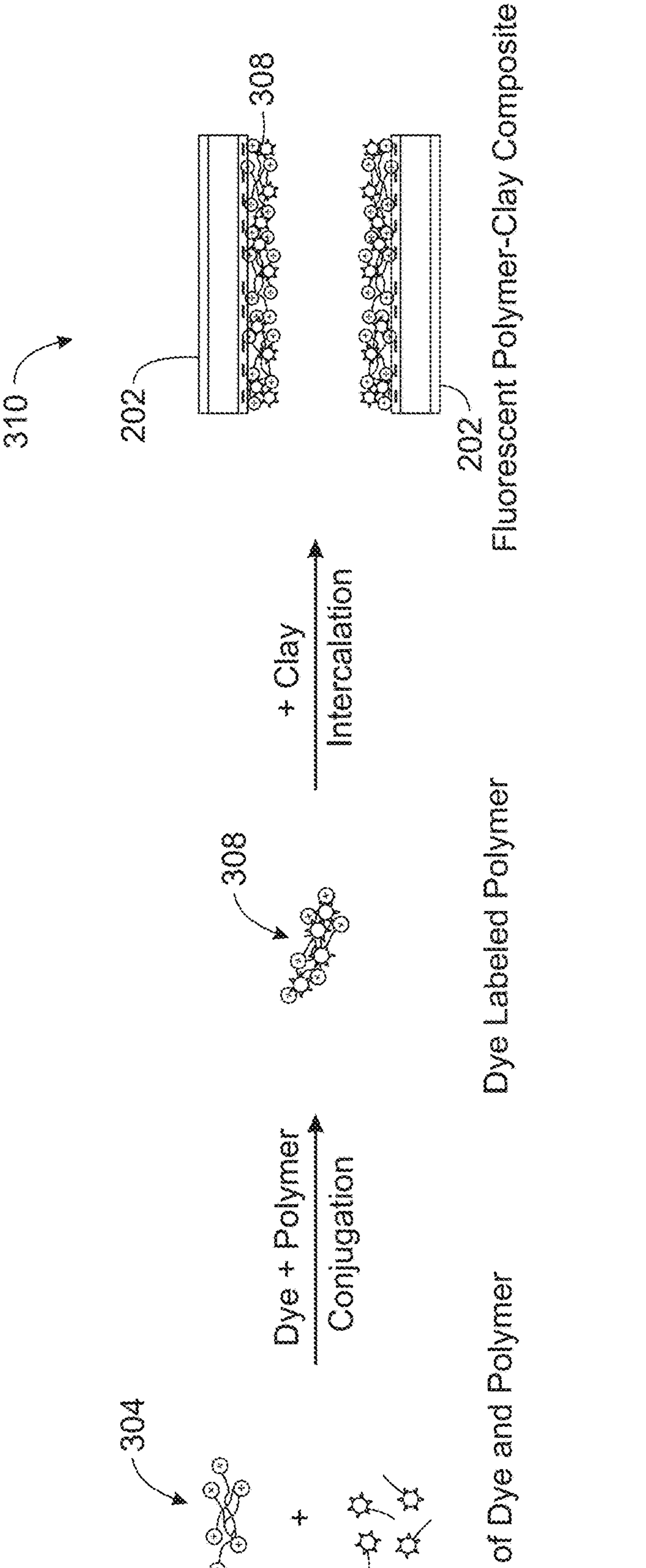
FIG. 3 shows an example reaction schematic where a fluorescent dye and a polymer structure are conjugated to yield a fluorescent polymer.

In some implementations, the reaction between the fluorescent dye and the polymer structure can occur before the polymer is adsorbed onto a nanoclay structure. FIG. 3 shows an example reaction schematic where a fluorescent dye 306 and a polymer structure 304 are conjugated to yield a fluorescent polymer 308. The fluorescent polymer 308 is intercalated in nanoclay layers 202 to yield a fluorescent polymer-clay composite 310.

Figure 4:
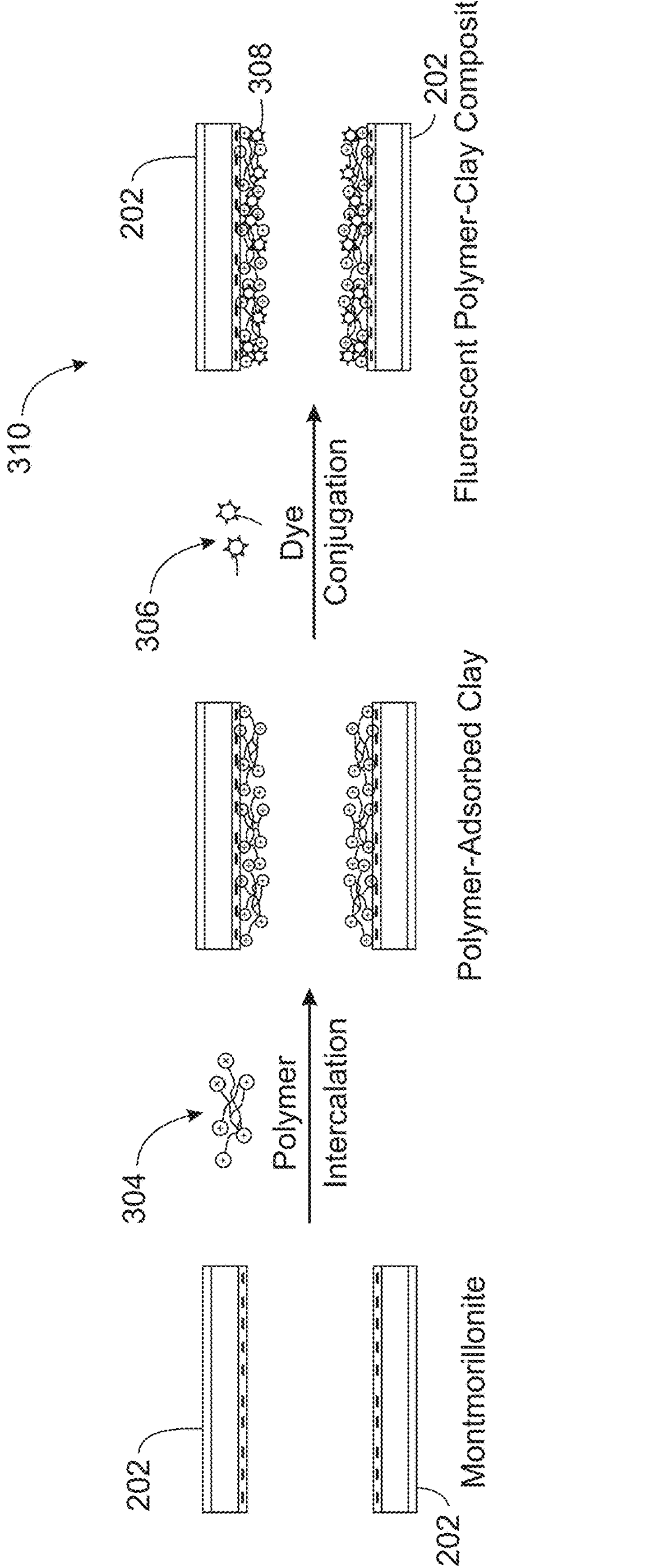
FIG. 4 shows an example reaction schematic where the polymer is first adsorbed to the clay, followed by a reaction between a fluorescent dye and the polymer.

In some implementations, the polymer structure is intercalated into the nanoclay structure before the dye is reacted with the polymer structure to yield a fluorescent polymer-clay composite. FIG. 4 shows an example reaction schematic where the polymer 304 is first adsorbed to the clay, followed by a reaction between a fluorescent dye 306 and the polymer.

Figure 5:
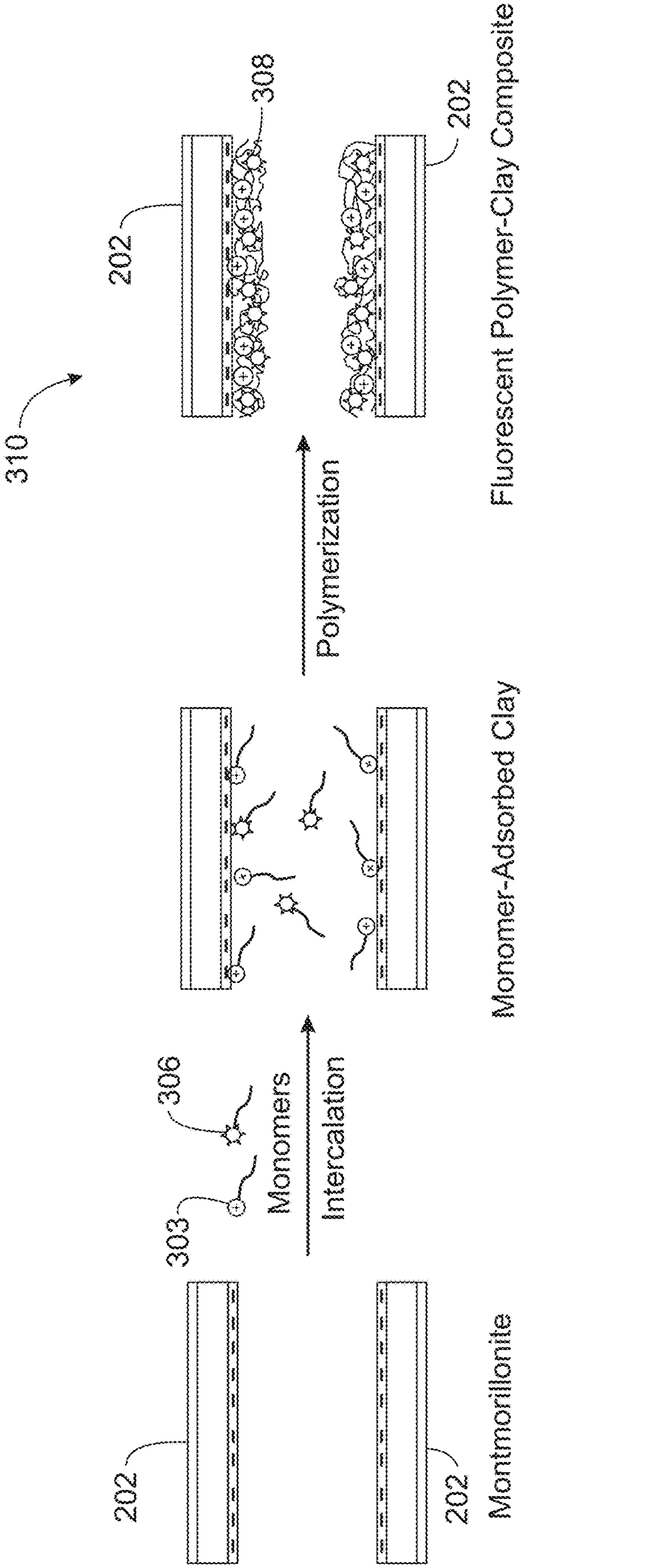
FIG. 5 shows an example schematic where monomeric units of the polymer structure and the fluorescent dye are intercalated in between layers of nanoclay structure, followed by polymerization to yield a fluorescent polymer-clay composite.

In some implementations, a mixture of monomers and fluorescent dyes are polymerized in the presence of a nanoclay to yield a fluorescent polymer-clay composite. FIG. 5 shows an example schematic where monomeric units 303 of the polymer structure and the fluorescent dye 306 are intercalated in between layers 202 of nanoclay structure, followed by polymerization to yield a fluorescent polymer-clay composite 310.

Each of the components of the fluorescent polymer-clay composite provide advantageous effects. For example, the fluorescent dyes provide multiple avenues for disambiguation between different tags containing different fluorescent moieties. The fluorescent dyes can be distinguished from one another by their fluorescent properties. Alternatively or in addition, thermal treatment at certain temperatures can cause the dye molecules to be released from the polymer structure, and the polymer can further degrade into segments which are related to their original monomers. The released fluorescent dyes or polymer segments can be further identified by mass spectrometry, for example by pyrolysis-gas chromatography—mass spectrometry (Pyrolysis-GC-MS).

The fluorescent polymer-clay composites also contain polymers. Different types of polymers in different composites can be differentiated from one another. In some implementations, the polymer is a water soluble, linear, or branched polyamine. Polyamines and alkylpolyamines have been shown to have strong and stable adsorption to various clays. The polyamine structure includes primary and secondary amines. In some implementations, the polyamine structure can be engineered to degrade with predictable degradation products. For example, the polymers can be degraded at high temperature through pyrolysis process. These degradation products can be measured chromatographically, for example with pyrolysis gas chromatography-mass spectroscopy (Pyrolysis-GC-MS). Accordingly, polyamine polymers with different degradation products can be differentiated from one another, and can be used to create a library of uniquely identifiable fluorescent polymer-clay composites.

Figure 6:
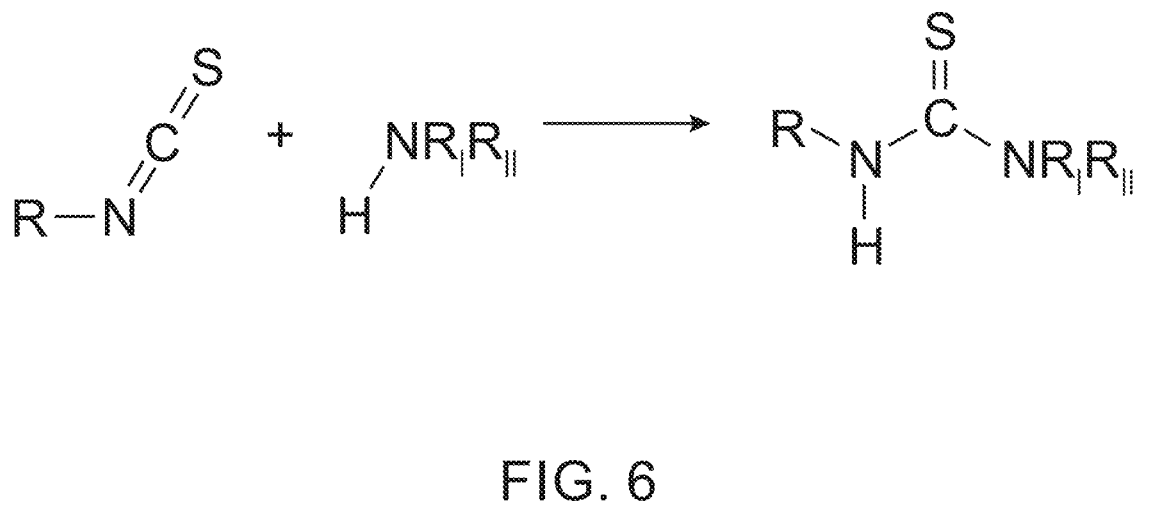

A fluorescent dye can be covalently bound to the polyamine structure to yield a fluorescent polyamine structure. In some implementations, the fluorescent dye can be attached by a reaction between primary and secondary amines of the polyamine structure with isothiocyanate containing fluorescent dyes. Suitable isothiocyanate dyes include fluorescein isothiocyanate (FITC) and Rhodamine B isothiocyanate (RBITC). For example, poly(allylamine hydrochloride) and FITC can react to form poly(fluorescein isothiocyanate allylamine hydrochloride). FIG. 6 shows an example reaction of isothiocyanate with a primary or secondary amine to yield a substituted thiourea, where R is a fluorescent dye and where $R_I$ and $R_{II}$ can be H, alkyl, or aryl groups.

Figure 7:
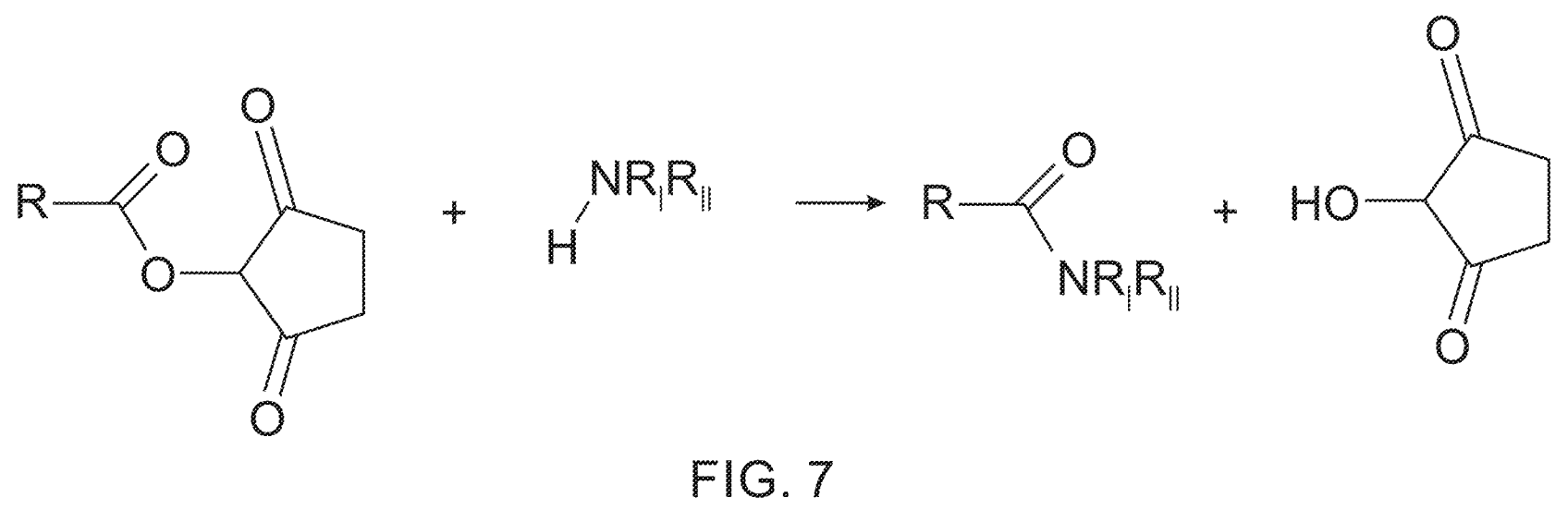

In some implementations, the fluorescent dye can be covalently bound to the polyamine structure with another type of amine-reactive functional group. For example, a fluorescent dye that contains an N-hydroxysuccinimide ester (NHS ester) will react to form a covalent bond with a primary or secondary amine. FIG. 7 shows an example reaction between an NHS ester and a primary or secondary amine, where R is a fluorescent dye and where $R_I$ and $R_{II}$ can be H, alkyl, or aryl groups.

Figure 8:
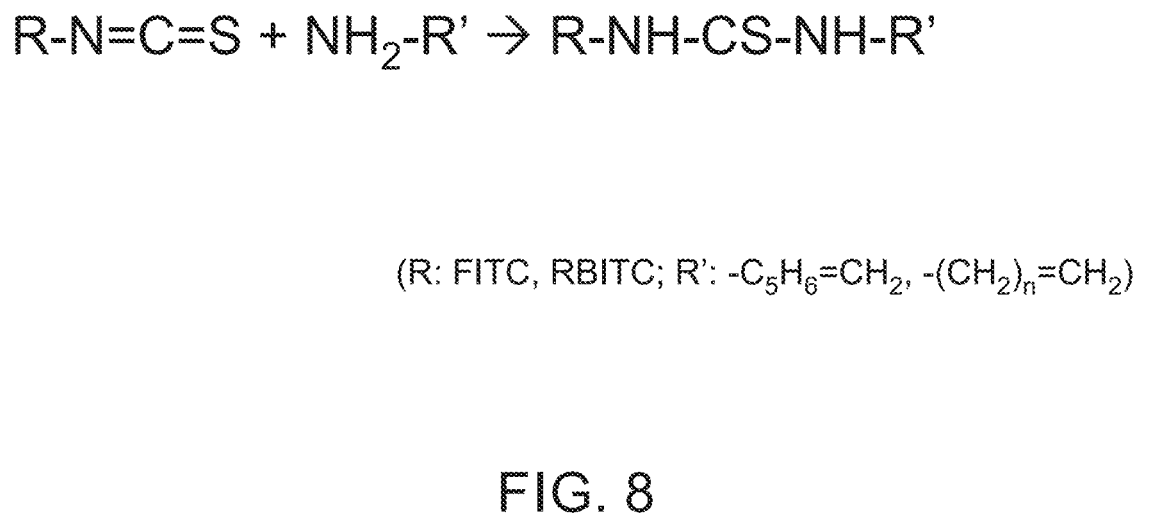
Figure 9:
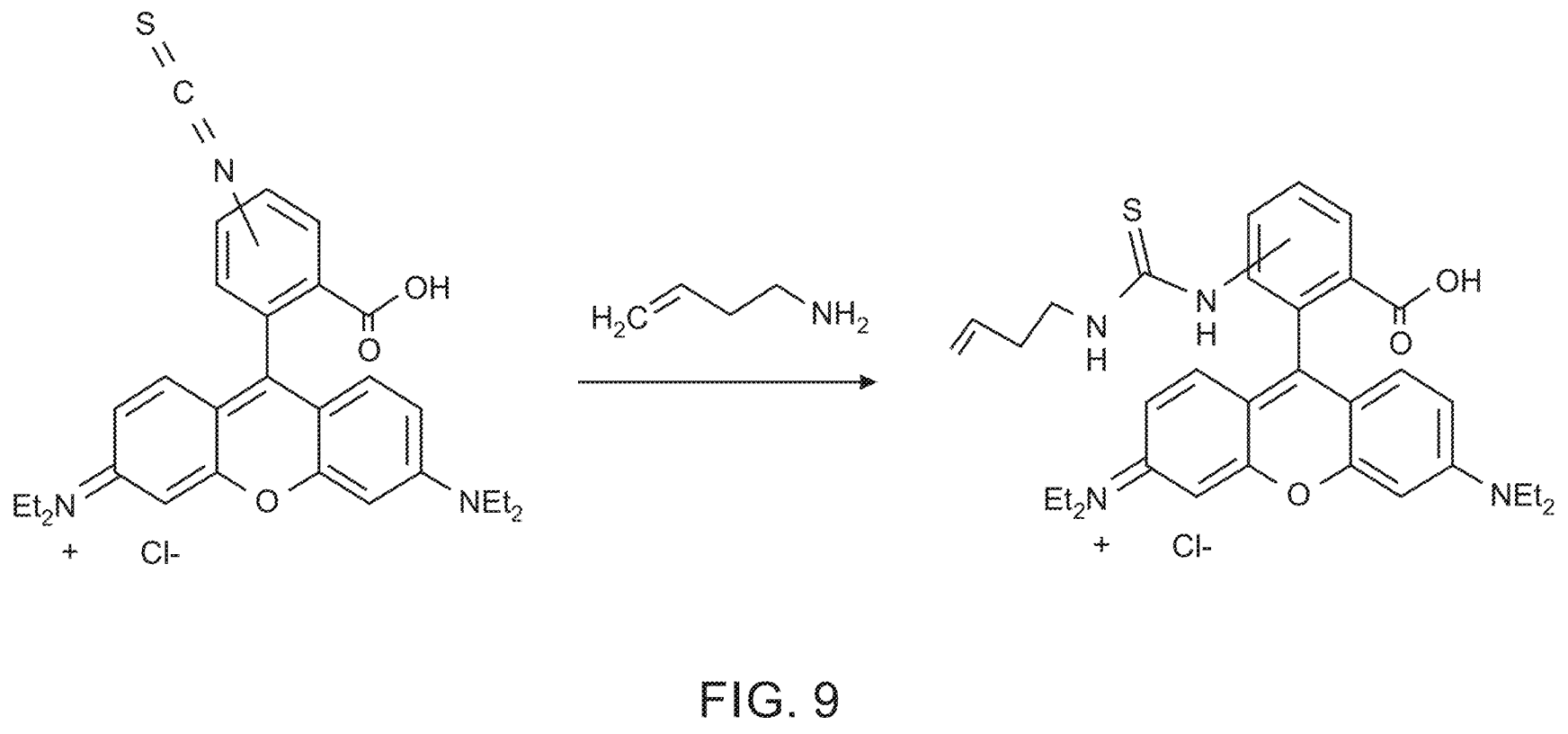

In some implementations, fluorescent polymer-clay composites can by synthesized with polyacrylic acid (PAA), polymethyl methacrylate (PMMA), polyvinylpyrrolidone (PVP), or polyvinyl alcohol (PVA). In some implementations, fluorescent polymer-clay composites can be synthesized with polystyrene-based polymers. Polystyrene (PS) based polymers have strong interactions with clays. The polystyrene-based polymers can be conjugated with a fluorescent dye. In some implementations, the dye is functionalized before conjugation with the polymer. For example, an isothiocyanate containing dye can be functionalized to introduce a reactive allyl group. Suitable isothiocyanate dyes include FITC and RBITC. FIG. 8 shows an example reaction between an isothiocyanate containing dye and a reactant that includes a primary amine and an allyl group to yield an allyl-containing fluorescent dye. The reactant can be a monomer with allyl and amino groups. Suitable monomers with allyl and amino groups include allylamine, N-allylmethylamine, N-vinylformamide, 2-methyl-2-propen-1-amine, and 2-methylallylamine, 3-buten-1-amine, 4-vinylaniline, or 3-vinylaniline. In more detail, FIG. 9 shows an example reaction between an isothiocyanate containing fluorescent dye and 3-buten-1-amine to yield an allyl-containing fluorescent dye.

Figure 10:
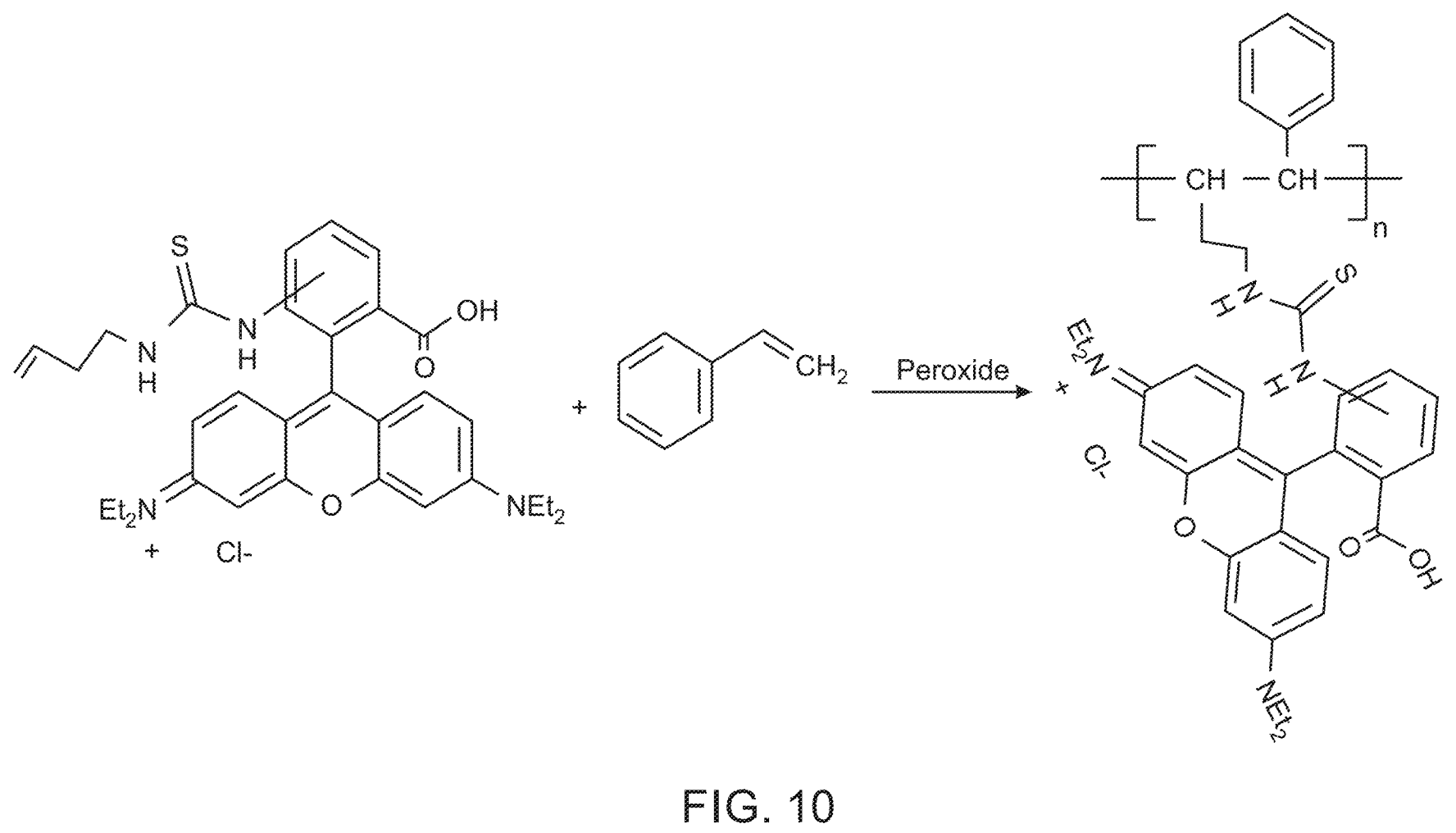

Next, the allyl-containing fluorescent dye can be conjugated to a styrene-based monomer or an acrylate-based monomer by radical polymerization. FIG. 10 shows an example reaction of an allyl-containing fluorescent dye with a styrene monomer, where free radical-induced polymerization yields a fluorescent styrene-based polymer with n number of repeating units. Depending on the numbers of n, the polymers can have molecular weights from hundreds to tens of thousands of Daltons. This polymerization reaction can take place in the presence of a nanoclay to yield a fluorescent polymer-clay composite. FIG. 10 shows an example reaction with a styrene monomer, however, other styrene-based monomers or acrylate-based monomers can also be used. Suitable monomers include, but are not limited to, styrene, p-methyl styrene, p-methoxystyrene, 2,4-dimethyl styrene, 2,4,6-trimethyl styrene, 4-fluorostyrene, 3-fluorostyrene, 2-fluorostyrene, 4-chlorostyrene, 3-chlorostyrene, 2-chlorostyren, 4-bromostyrene, 3-bromostyrene, 2-bromostyrene, 4-vinylbenzyl chloride, allylbenzene, allylpentafluorobenzene, acrylate, benzyl acrylate, phenyl methacrylate, hexyl methacrylate, butyl methacrylate, isobutyl methacrylate, propyl methacrylate, vinyl methacrylate, methyl methacrylate, 2-hydroxyethyl methacrylate, pentafluorophenyl methacrylate, N-allylbenzylamine, (vinylbenzyl)trimethylammonium chloride, or N,N-dimethylvinylbenzylamine, or any combination thereof. Accordingly, the polymers that are formed can have different fingerprint-like molecular signatures and can be differentiated from one another using mass spectrometry, for example pyrolysis-gas chromatography-mass spectrometry. The different polymers can therefore be used to create a library of uniquely identifiable fluorescent polymer-clay composites.

Figure 11:
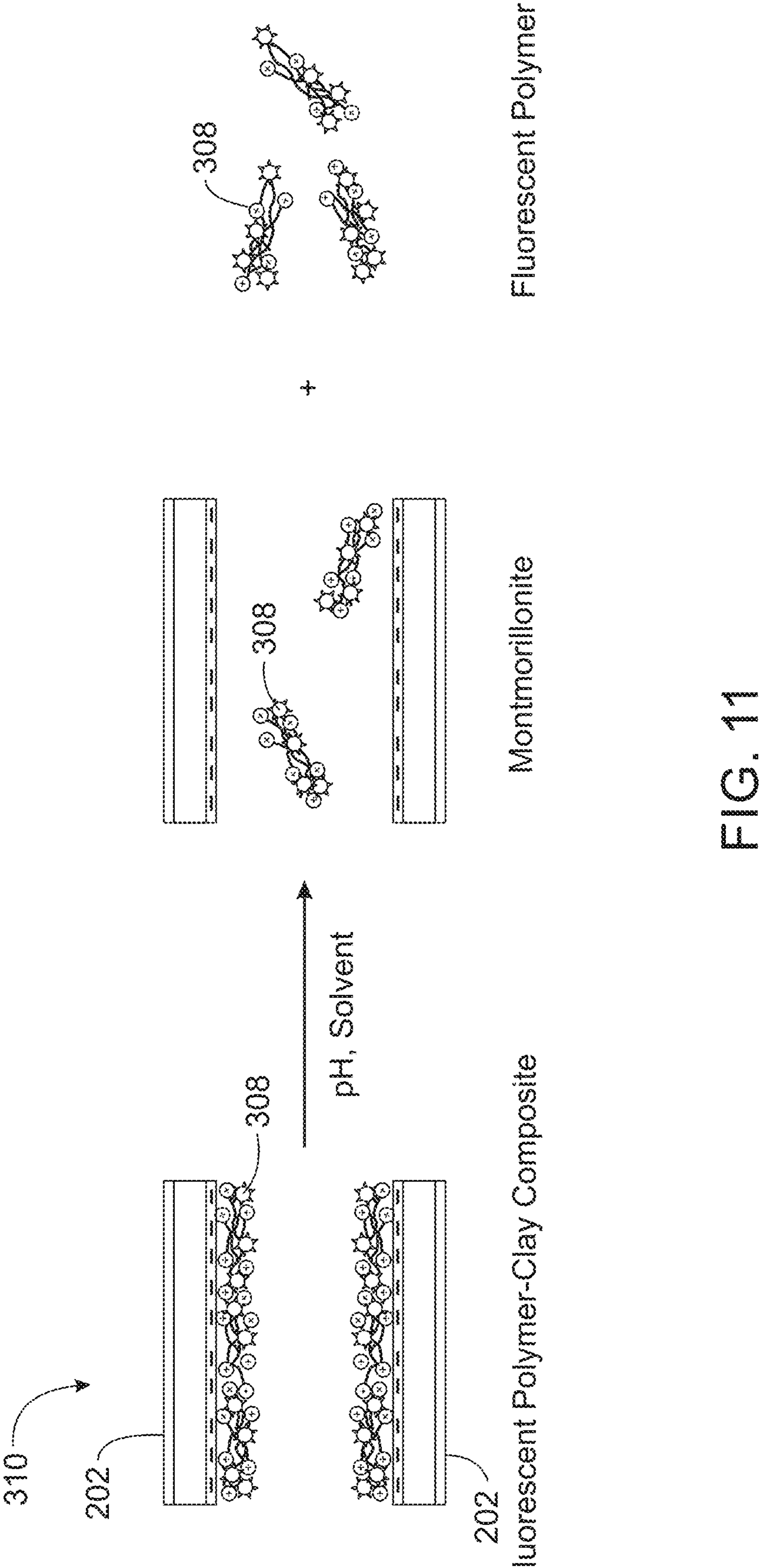
FIG. 11 shows an example schematic where the fluorescent polymer is dissociated from the complex by adjusting the pH or introducing a solvent.

As described herein, the fluorescent polymer-clay composites can be used in subterranean applications and subsequently analyzed by fluorescence spectroscopy and mass spectrometry. In some implementations, the fluorescent polymer-clay composite can be analyzed by releasing the fluorescent polymer from the surfaces of the nanoclay. For example, controlled release of the fluorescent polymer can be achieved by specific solvents or by adjusting the pH of a solution containing the fluorescent polymer-clay composite. FIG. 11 shows an example schematic of this process, where the fluorescent polymer is dissociated from the complex by adjusting the pH or introducing a solvent. In some implementations, adjusting the pH to approximately 10 results in the release of a fluorescent polyamine polymer from the composite. The released fluorescent polyamine polymer can then be analyzed, for example with fluorescence analysis or mass spectroscopy as described herein. Alternatively, an organic solvent can be used to release the fluorescent polystyrene-based polymer from the composite. Suitable organic solvents include alcohol, acetone, acetonitrile, tetrahydrofuran, chloroform, and toluene. The released fluorescent polystyrene-based polymer can then be analyzed, for example with fluorescence analysis or mass spectroscopy as described herein.

The fluorescent polymer-clay composites described herein can be used as tags in subterranean applications, for example as an additive in drilling mud. The fluorescent polymer-clay composites described herein readily mix with water-based or oil-based drilling mud, for example by simple mechanical stirring.

The tags can be mixed with the drilling mud and flowed or pumped down a work string into a subterranean formation. The mud and tag mixture exits the work string at the drill bit. Accordingly, the tags come into contact with the subterranean formation for the first time as they exit the drill bit. The tags can embed into or decorate the subterranean formation and the cuttings produced by the drill. The drilling mud carries the cuttings to the surface of the wellbore, where they can be recovered and analyzed.

As described herein, the multi-modal nature of these tags allows for a two-stage analysis. In a first stage, for the collected cuttings, a rapid fluorescence measurement can be made in situ on the cuttings by a portable fluorescence imaging system or a portable reflectance fluorescence spectrometer. For the cutting samples exhibiting fluorescence, a second stage lab analysis can be applied. In the second stage, the cuttings with adsorbed nanoclay tags can be rinsed and dispersed into water or organic solvents (for example, methanol, ethanol, acetone, acetonitrile, tetrahydrofuran, chloroform, or toluene, etc.) or a mixture of water-organic solvent for example, a water-alcohol mixture). Sonication and pH adjustment may be applied to promote the fluorescent polymer release from the nanoclay to solution, and the filtered solution can be used for further precise analysis, for example, fluorescence spectroscopy or Pyrolysis-GC-MS.

Figure 12:
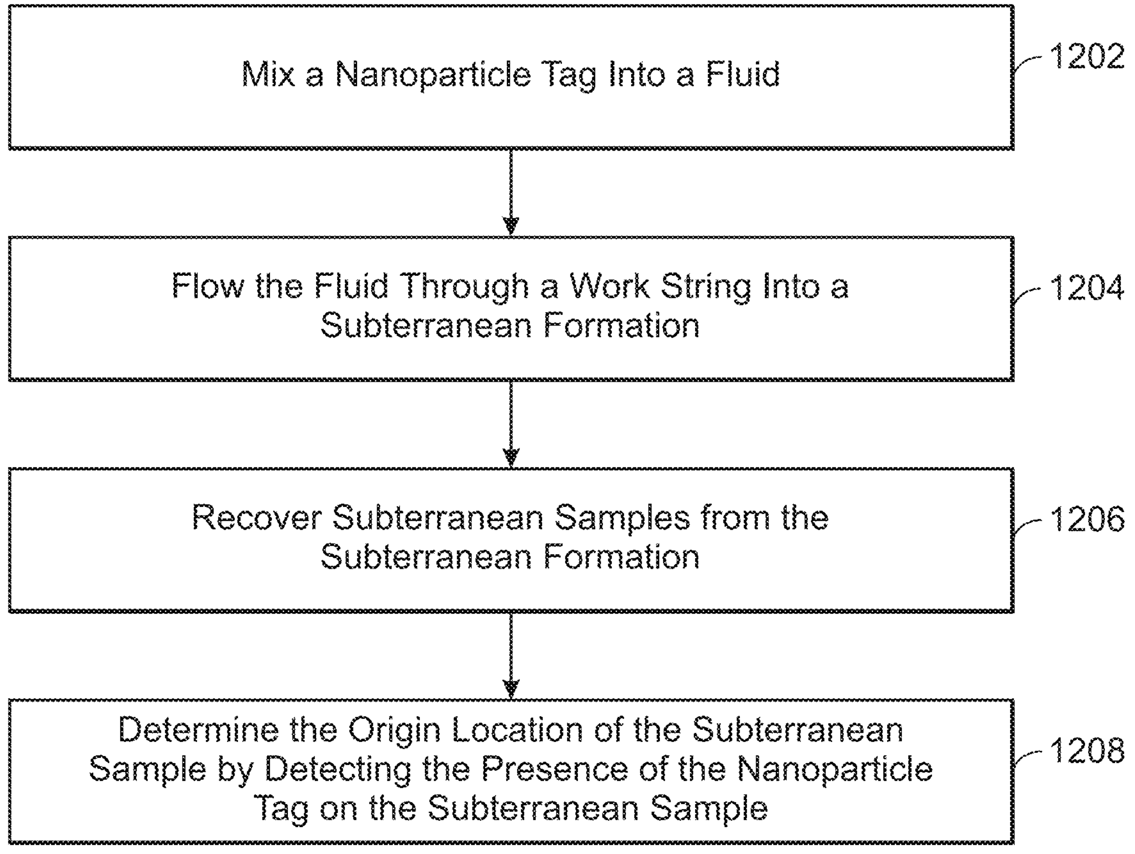
FIG. 12 shows a flowchart of an example method of determining the origin location of a subterranean sample.

For example, FIG. 12 shows a flowchart of an example method 1200 of determining the origin location of a subterranean sample. At 1202, the nanoparticle tag is mixed into a fluid. At 1204, the fluid is flowed through a work string into a subterranean formation. At 1206, subterranean samples are recovered from the subterranean formation. At 1208, the origin location of the subterranean sample is determined by detecting the presence of the nanoparticle tag on the subterranean sample.

In some implementations, the fluorescent polymer is dissociated from the nanoclay, for example by adjusting the pH or with an organic solvent. Accordingly, the identity of the fluorescent polymer-clay composite can be determined by subsequent fluorescence or mass spectrometry analyses.

Figure 13:
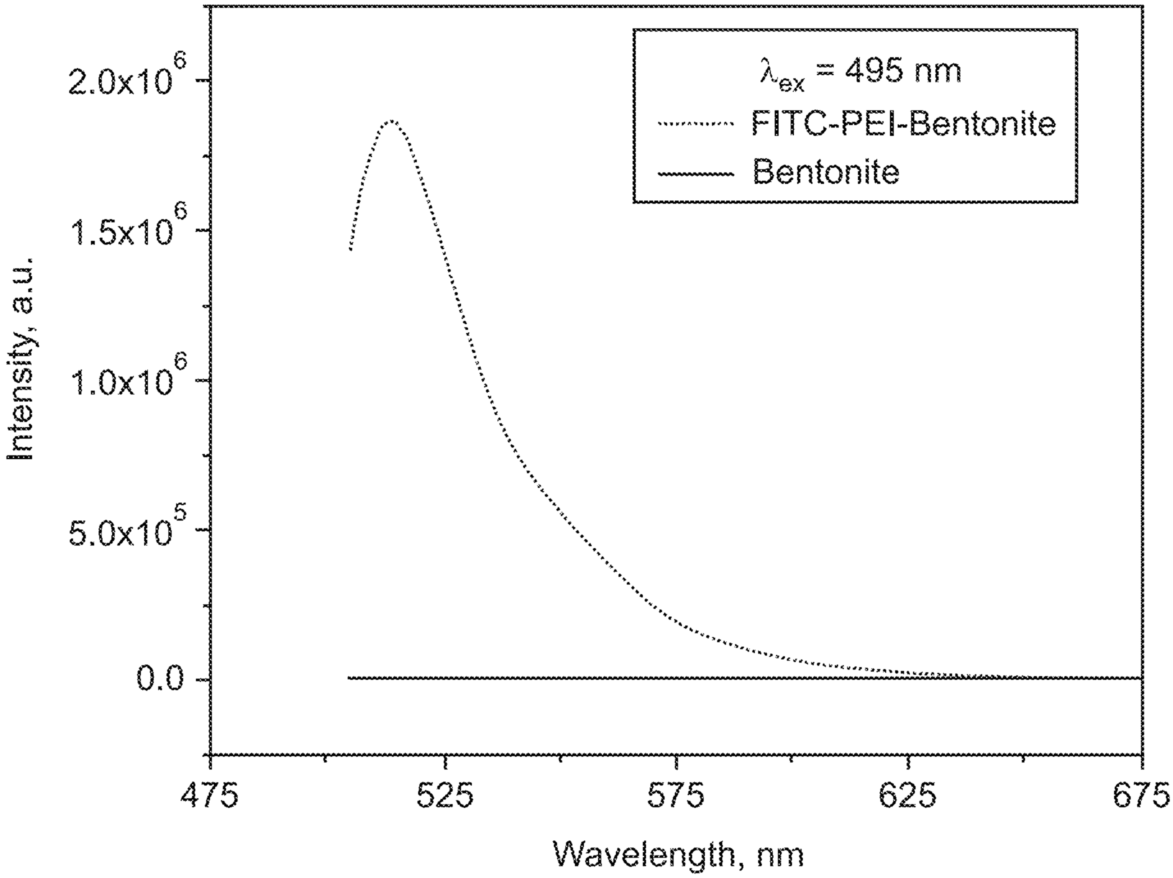
FIG. 13 shows an example fluorescence spectrum of an FITC-PEI-bentonite functionalized polymer-clay composite.

Example 1: Synthesis of Fluorescent Polyethylenimine—Clay Composites 0.1 grams of fluorescein isothiocyanate (FITC) or Rhodamine B isothiocyanate (RBITC) were dissolved in 20 mL of 95% ethanol in water. Next, 1 g of 50% polyethylenimine (PEI) was added to the solution under magnetic stirring. The mixture was allowed to react overnight, resulting in dye molecules that were grafted to PEI via stable covalent bonds. The solution was further diluted to 100 mL with water. 10 g of bentonite nanopowder was added with stirring. The bentonite and fluorescent PEI was allowed to react overnight to yield a fluorescent polymer-clay composite where the fluorescent PEI was intercalated into the bentonite nanoparticles. FIG. 13 shows an example fluorescence spectrum of an FITC-PEI-bentonite functionalized polymer-clay composite, as well as the fluorescence spectrum of bentonite without functionalization. The excitation wavelength was 495 nm. As shown in FIG. 13, the functionalized polymer-clay composite shows a strong fluorescence signal whereas the bentonite itself is not fluorescent.

Figure 14:
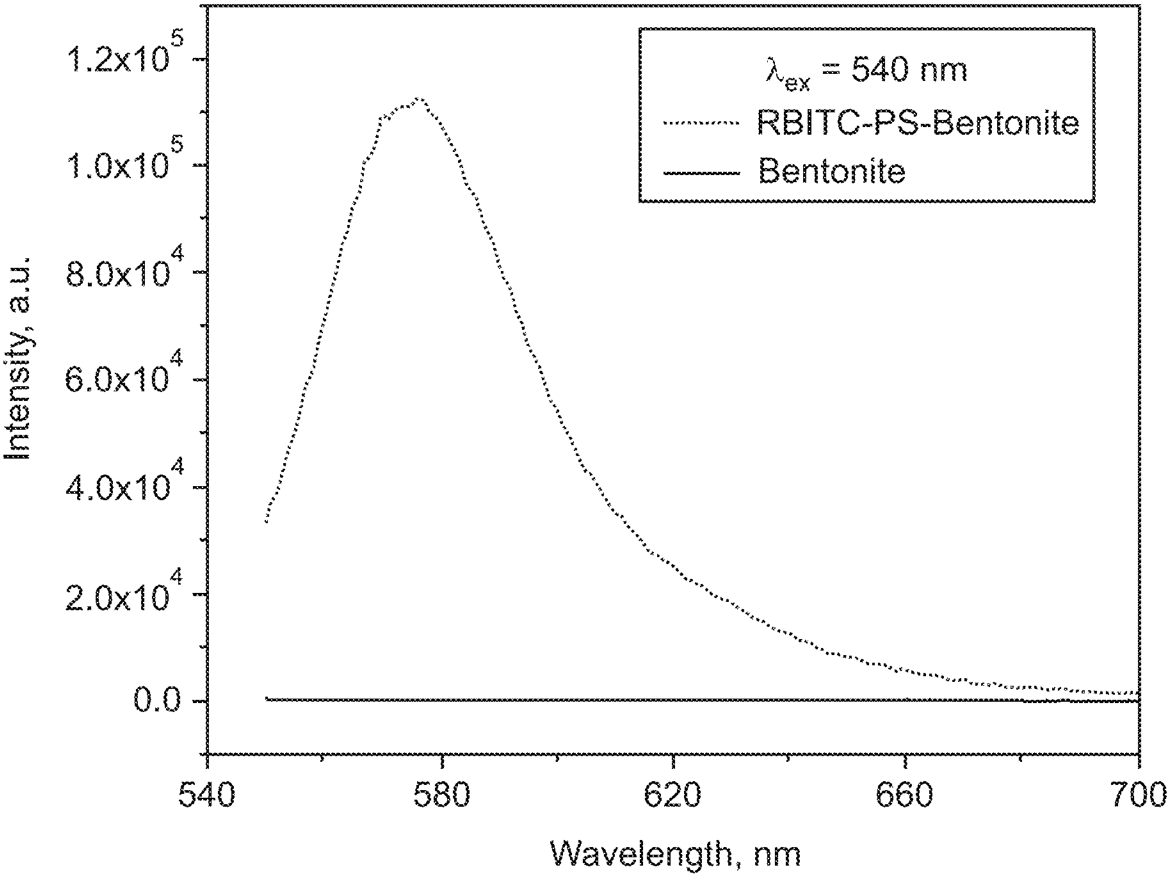
FIG. 14 shows an example fluorescence spectrum of an RBITC-PS-bentonite functionalized polymer-clay composite.

Example 2: Synthesis of Fluorescent Polystyrene—Clay Composites 1 g of 50% PEI in water was diluted in 80 mL of water, followed by the addition of 10 g of dry powder of bentonite nanoclays. The mixture was stirred for 24 hours to yield bentonite nanoclays with intercalated PEI. Next, 20 mL of dye solution (0.1 g of FITC or RBITC in 95% ethanol) was added to react with PEI overnight to yield the fluorescent polymer-clay composite. FIG. 14 shows an example fluorescence spectrum of an RBITC-PS-bentonite functionalized polymer-clay composite, as well as the fluorescence spectra of bentonite without functionalization. The excitation wavelength was 540 nm. As shown in FIG. 14, the functionalized polymer-clay composite shows a strong fluorescence signal whereas the bentonite itself is not fluorescent.

FIGS. 15A-15F show SEM images of bentonite nanopowder before and after functionalization with FITC-PEI and RBITC-PS.

Figure 15A:
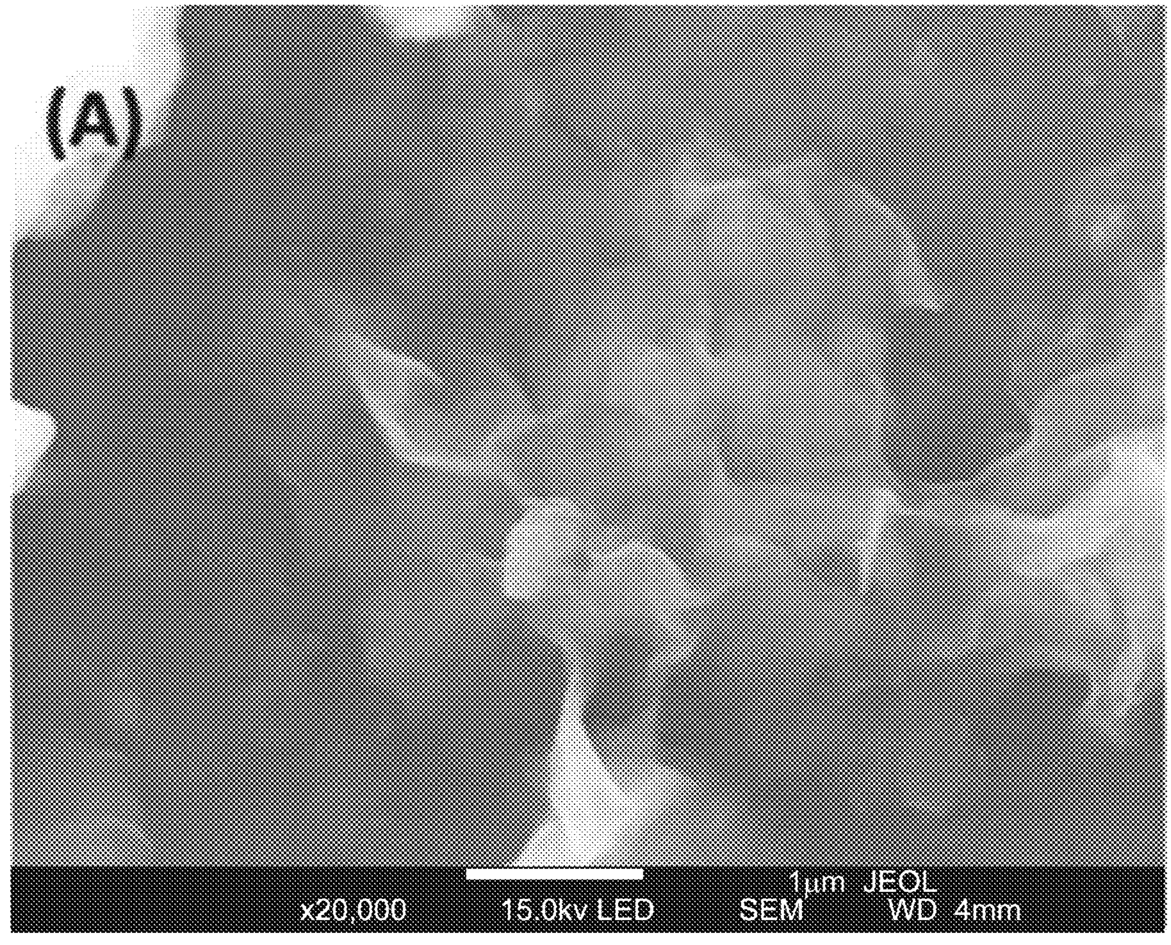
FIG. 15A shows an example SEM image of bentonite nanopowder before functionalization.
Figure 15B:
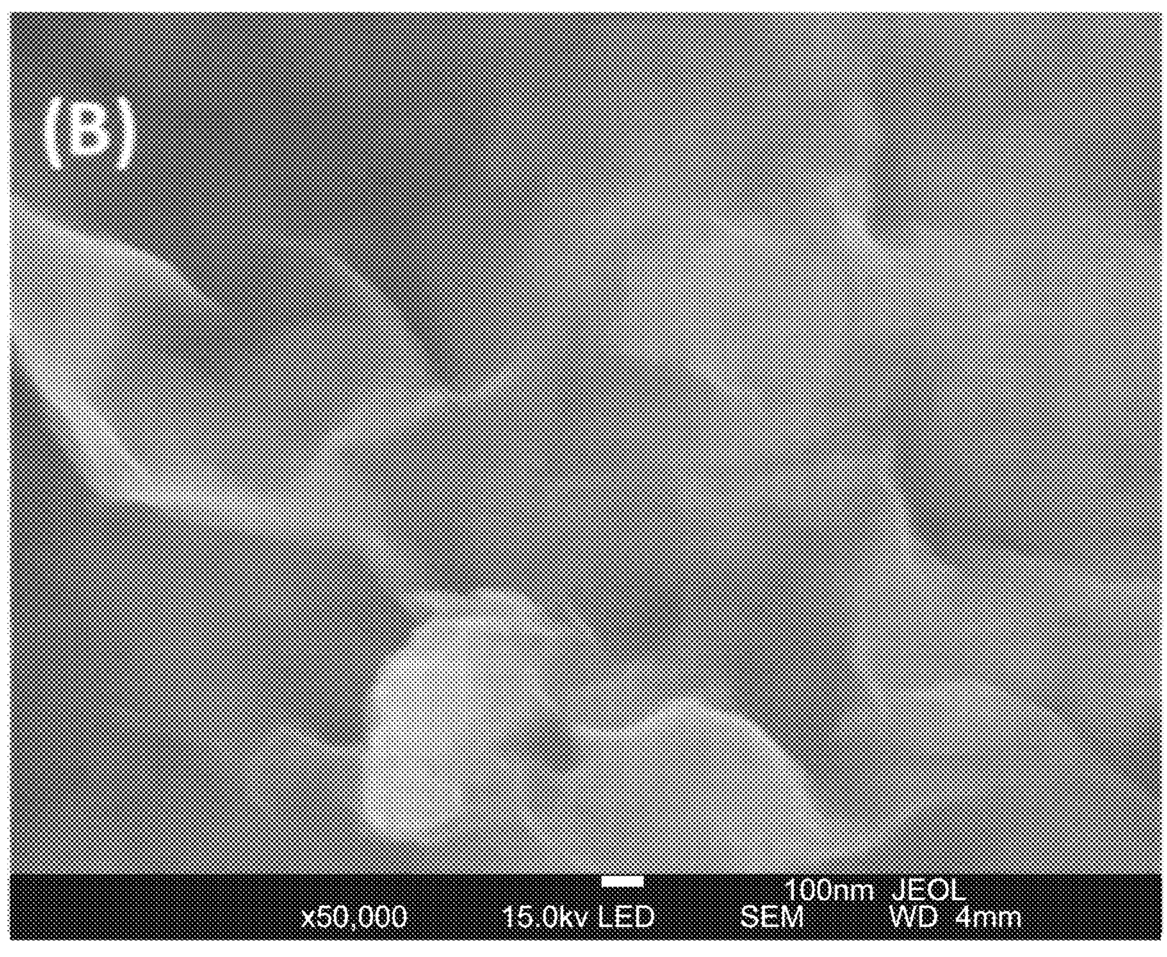
FIG. 15B shows an example SEM image of bentonite nanopowder before functionalization.

FIG. 15A shows an example SEM image of bentonite nanopowder before functionalization at 20,000× magnification. FIG. 15B shows an example SEM image of bentonite nanopowder before functionalization at 50,000× magnification.

Figure 15C:
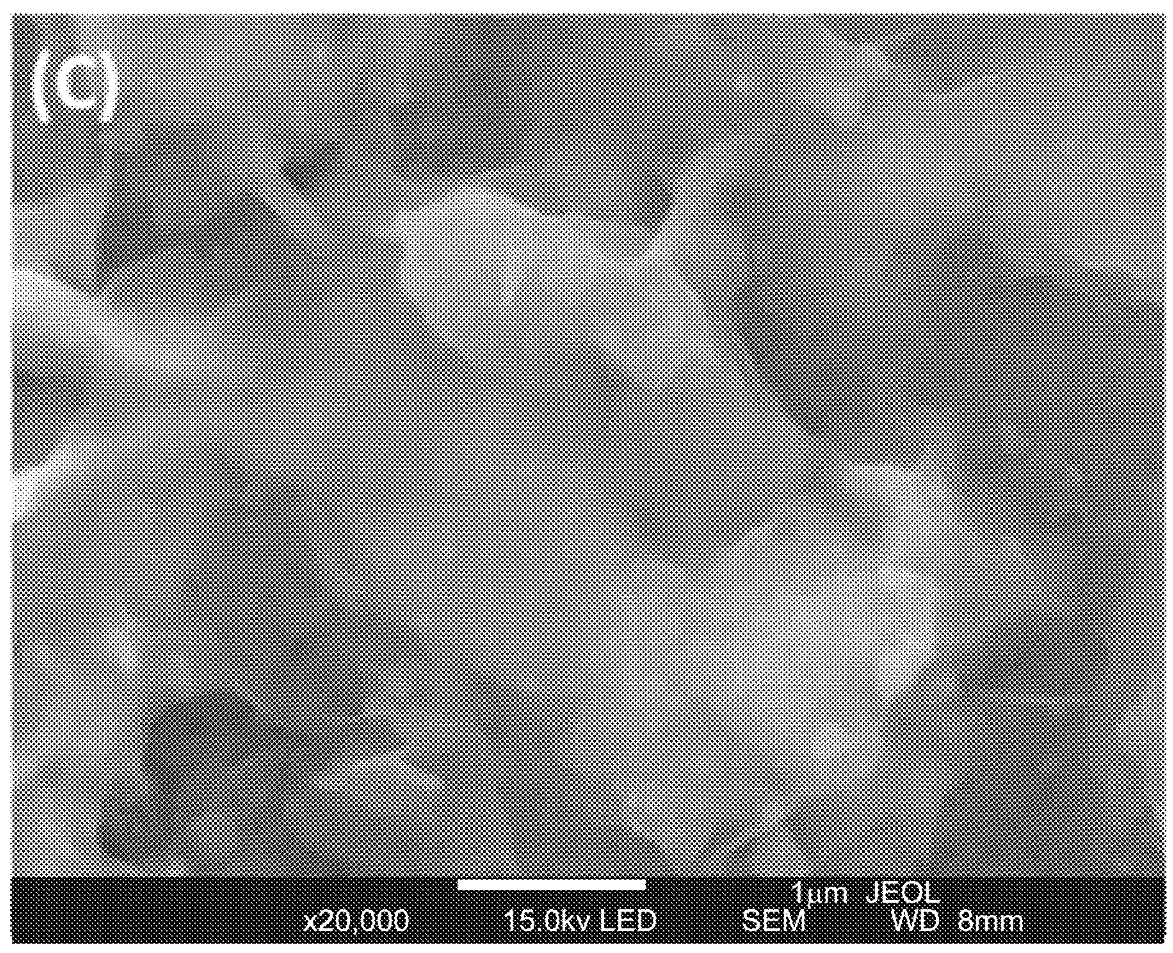
FIG. 15C shows an example SEM image of bentonite nanopowder functionalized with FITC-PEI.
Figure 15D:
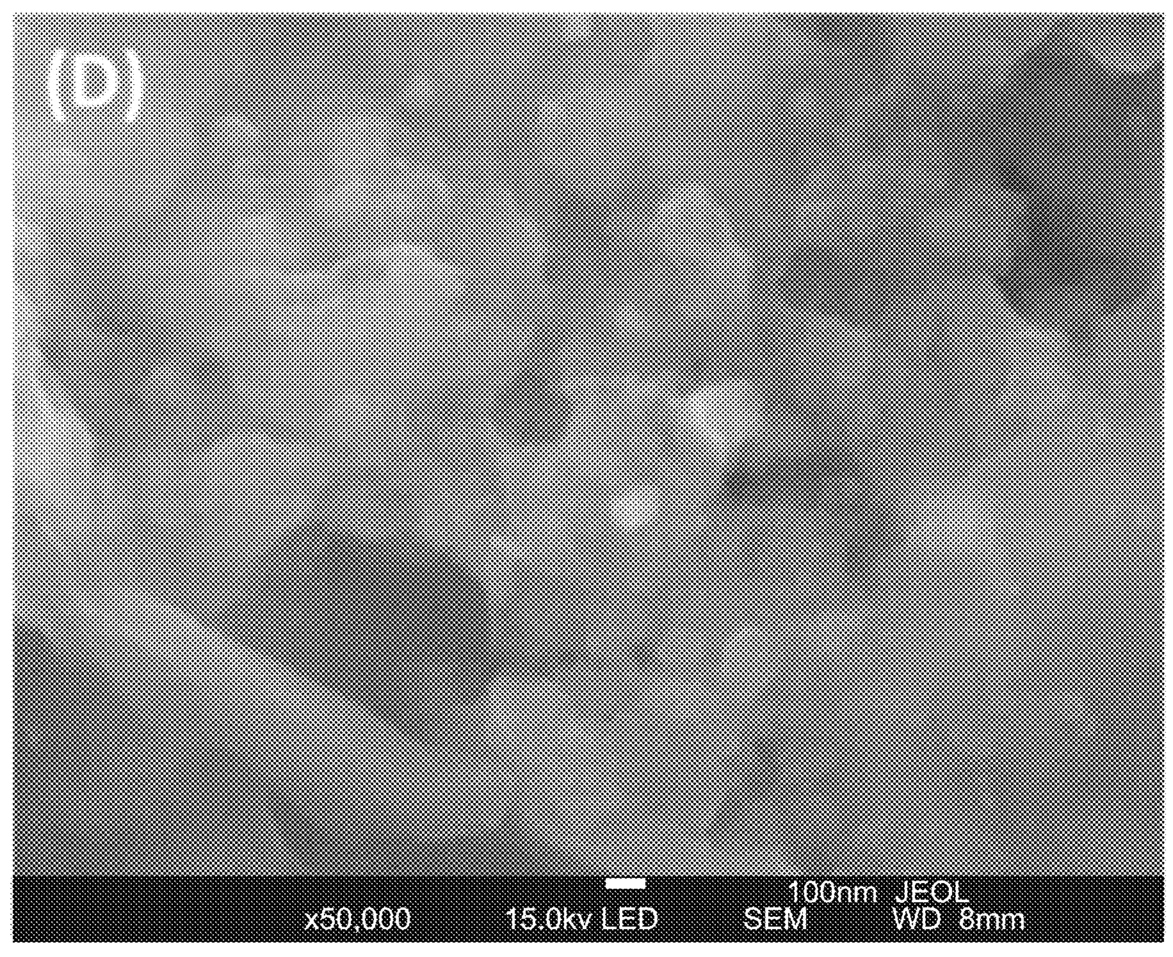
FIG. 15D shows an example SEM image of bentonite nanopowder functionalized with FITC-PEI.

FIG. 15C shows an example SEM image of bentonite nanopowder functionalized with FITC-PEI at 20,000× magnification. FIG. 15D shows an example SEM image of bentonite nanopowder functionalized with FITC-PEI at 50,000× magnification.

Figure 15E:
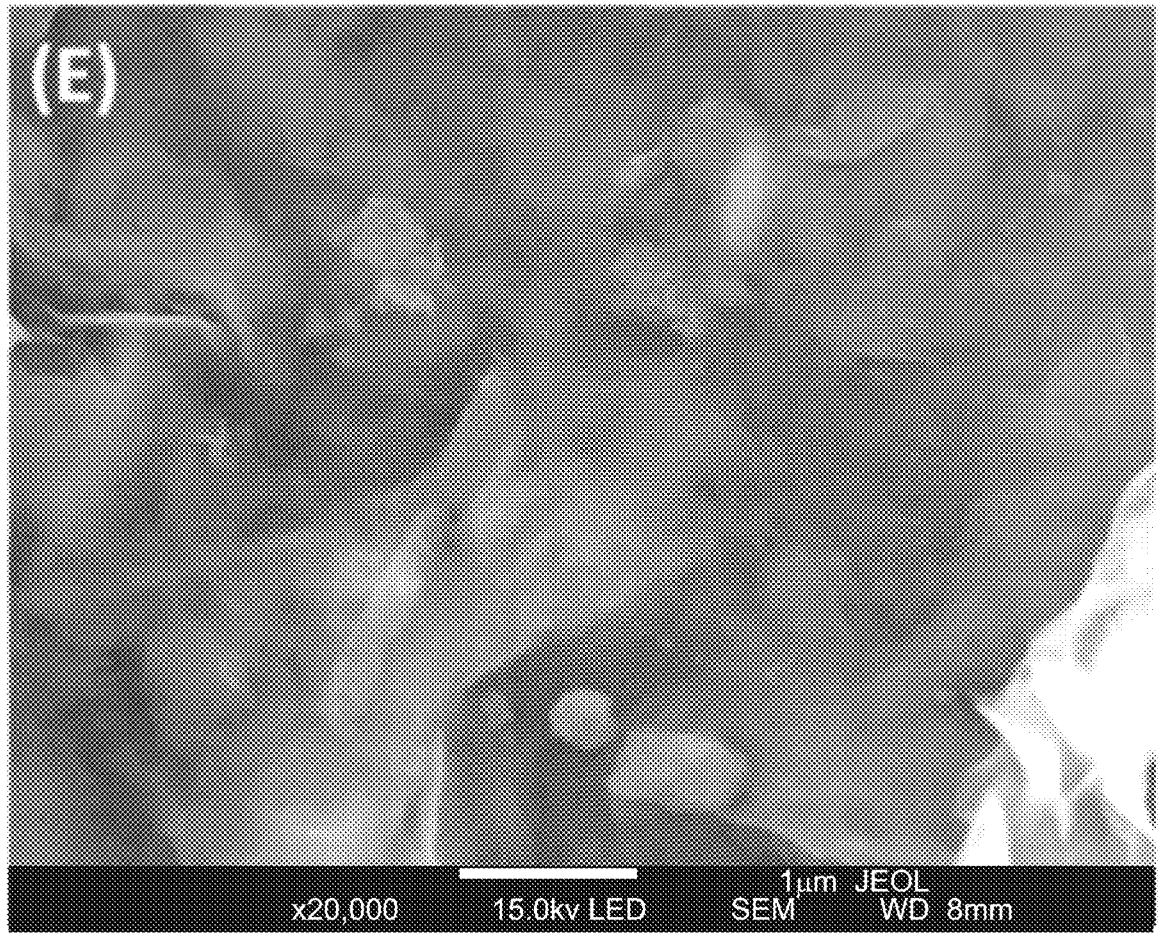
FIG. 15E shows an example SEM image of bentonite nanopowder functionalized with RBITC-polystyrene.
Figure 15F:
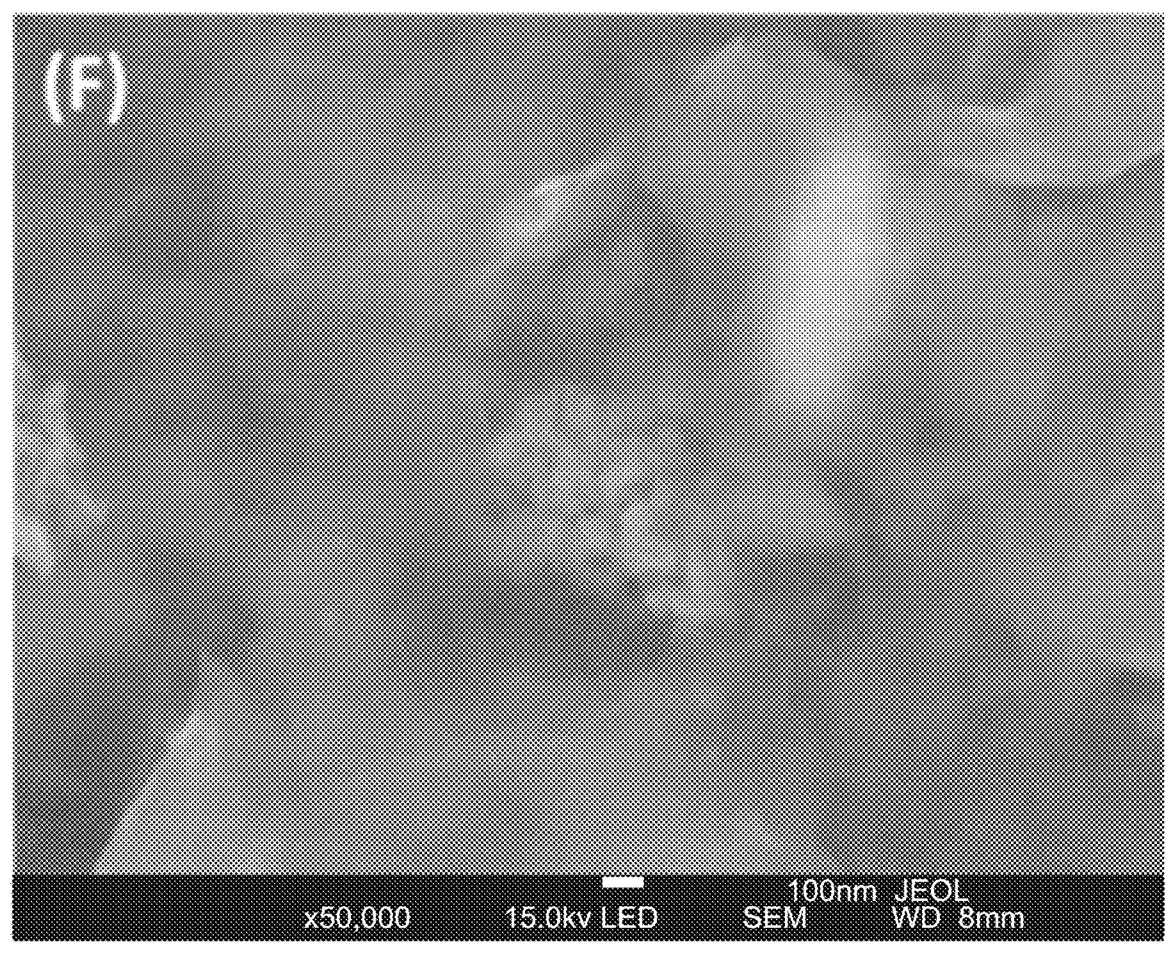
FIG. 15F shows an example SEM image of bentonite nanopowder functionalized with RBITC-polystyrene.

FIG. 15E shows an example SEM image of bentonite nanopowder functionalized with RBITC-polystyrene (PS) at 20,000× magnification. FIG. 15F shows an example SEM image of bentonite nanopowder functionalized with RBITC-PS at 50,000× magnification.

The term "about" as used in this disclosure can allow for a degree of variability in a value or range, for example, within 10%, within 5%, or within 1% of a stated value or of a stated limit of a range.

The term "substantially" as used in this disclosure refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The following units of measure have been mentioned in this disclosure:

| Unit of Measure | Full form |
|---|---|
| g | gram |
| mL | milliliter |
| nm | nanometer |

In some implementations, a polymer-clay composite tag includes a nanoclay. The nanoclay includes a plurality of layers, and a polymer intercalated between the layers of the nanoclay. The polymer is functionalized with a fluorescent dye.

This aspect, taken alone or combinable with any other aspect, can include the following features. The polymer includes polyethylenimine or polyallylamine.

This aspect, taken alone or combinable with any other aspect, can include the following features. The polymer includes a polystyrene-based polymer.

This aspect, taken alone or combinable with any other aspect, can include the following features. The polystyrene-based or polyacrylate-based polymer is synthesized from monomers selected from styrene, p-methylstyrene, p-methoxystyrene, 2,4-dimethyl styrene, 2,4,6-trimethylstyrene, 4-fluorostyrene, 3-fluorostyrene, 2-fluorostyrene, 4-chlorostyrene, 3-chlorostyrene, 2-chlorostyrene, 4-bromostyrene, 3-bromostyrene, 2-bromostyrene, 4-vinylbenzyl chloride, allylbenzene, allylpentafluorobenzene, acrylate, benzyl acrylate, phenyl methacrylate, hexyl methacrylate, butyl methacrylate, isobutyl methacrylate, propyl methacrylate, vinyl methacrylate, methyl methacrylate, 2-hydroxyethyl methacrylate, pentafluorophenyl methacrylate, N-allylbenzylamine, (vinylbenzyl)trimethylammonium chloride, and N,N dimethylvinylbenzylamine, or any combination thereof.

This aspect, taken alone or combinable with any other aspect, can include the following features. The fluorescent dye is an isothiocyanate-containing dye.

This aspect, taken alone or combinable with any other aspect, can include the following features. The isothiocyanate-containing dye includes fluorescein isothiocyanate or Rhodamine B isothiocyanate.

In some implementations, a method of synthesizing a polymer-clay composite includes functionalizing a polymer with a fluorescent dye to yield a fluorescent polymer and intercalating the fluorescent polymer in a nanoclay.

This aspect, taken alone or combinable with any other aspect, can include the following features. The polymer includes polyethylenimine or polyallylamine.

This aspect, taken alone or combinable with any other aspect, can include the following features. Functionalizing the polymer with a fluorescent dye includes reacting polyethylenimine or polyallylamine with an isothiocyanate-containing dye.

In some implementations, a method of synthesizing a polymer-clay composite includes intercalating styrene-based monomers or acrylate-based monomers and a fluorescent dye between the layers of a nanoclay and inducing radical polymerization to polymerize the styrene-based monomers and fluorescent dye to yield a fluorescent polymer-clay composite.

This aspect, taken alone or combinable with any other aspect, can include the following features. The styrene-based monomers or acrylate-based monomers include monomers selected from styrene, p-methylstyrene, p-methoxystyrene, 2,4-dimethyl styrene, 2,4,6-trimethylstyrene, 4-fluorostyrene, 3-fluorostyrene, 2-fluorostyrene, 4-chlorostyrene, 3-chlorostyrene, 2-chlorostyrene, 4-bromostyrene, 3-bromostyrene, 2-bromostyrene, 4-vinylbenzyl chloride, allylbenzene, allylpentafluorobenzene, acrylate, benzyl acrylate, phenyl methacrylate, hexyl methacrylate, butyl methacrylate, isobutyl methacrylate, propyl methacrylate, vinyl methacrylate, methyl methacrylate, 2-hydroxyethyl methacrylate, pentafluorophenyl methacrylate, N-allylbenzylamine, (vinylbenzyl)trimethylammonium chloride, and N,N dimethylvinylbenzylamine, or any combination thereof.

This aspect, taken alone or combinable with any other aspect, can include the following features. The fluorescent dye includes an isothiocyanate-containing dye.

This aspect, taken alone or combinable with any other aspect, can include the following features. The method includes functionalizing the isothiocyanate-containing dye to include an allyl group.

This aspect, taken alone or combinable with any other aspect, can include the following features. Functionalizing the isothiocyanate-containing dye to include an allyl group includes functionalizing the isothiocyanate dye with a monomer containing an allyl group, wherein the allyl group-containing monomers include monomers selected from the group consisting of allylamine, N-allylmethylamine, N-vinylformamide, 2-methyl-2-propen-1-amine, and 2-methylallylamine, 3-buten-1-amine, and 4(or 3)-vinylaniline, or any combination thereof.

This aspect, taken alone or combinable with any other aspect, can include the following features. Inducing radical polymerization includes inducing radical polymerization with a peroxide.

In some implementations, a method of determining the origin location of a subterranean sample includes mixing a polymer-clay composite tag into a fluid. The polymer-clay composite tag includes a nanoclay. The nanoclay includes layers and a fluorescent polymer intercalated between the layers of the nanoclay. The method includes flowing the fluid through a work string into a subterranean formation, recovering subterranean samples from the subterranean formation, and determining the origin location of the subterranean sample by detecting the presence of the polymer-clay composite tag.

This aspect, taken alone or combinable with any other aspect, can include the following features. Detecting the presence of the polymer-clay composite tag includes analyzing the subterranean sample for a fluorescence signal.

This aspect, taken alone or combinable with any other aspect, can include the following features. The method includes analyzing the fluorescent polymer with mass spectrometry.

This aspect, taken alone or combinable with any other aspect, can include the following features. Analyzing the fluorescent polymer with mass spectrometry further includes dissociating the fluorescent polymer from the nanoclay before analyzing with mass spectrometry.

This aspect, taken alone or combinable with any other aspect, can include the following features. Analyzing the fluorescent polymer with mass spectrometry includes degrading the polymers via a pyrolysis process, and identifying the degradation products through a pyrolysis gas chromatography-mass spectroscopy (Pyrolysis-GC-MS) process.

This aspect, taken alone or combinable with any other aspect, can include the following features. The fluorescent polymer includes polyethylenimine or polyallylamine.

This aspect, taken alone or combinable with any other aspect, can include the following features. Dissociating the fluorescent polymer from the nanoclay includes raising the pH of the polymer-clay composite tag.

This aspect, taken alone or combinable with any other aspect, can include the following features. The fluorescent polymer includes a polystyrene-based or polyacrylate-based polymer.

This aspect, taken alone or combinable with any other aspect, can include the following features. The polystyrene-based or polyacrylate-based polymer is synthesized from monomers selected from styrene, p-methylstyrene, p-methoxystyrene, 2,4-dimethyl styrene, 2,4,6-trimethyl styrene, 4-fluorostyrene, 3-fluorostyrene, 2-fluorostyrene, 4-chlorostyrene, 3-chlorostyrene, 2-chlorostyrene, 4-bromostyrene, 3-bromostyrene, 2-bromostyrene, 4-vinylbenzyl chloride, allylbenzene, allylpentafluorobenzene, acrylate, benzyl acrylate, phenyl methacrylate, hexyl methacrylate, butyl methacrylate, isobutyl methacrylate, propyl methacrylate, vinyl methacrylate, methyl methacrylate, 2-hydroxyethyl methacrylate, pentafluorophenyl methacrylate, N-allylbenzylamine, (vinylbenzyl)trimethylammonium chloride, and N,N dimethylvinylbenzylamine, or any combination thereof.

This aspect, taken alone or combinable with any other aspect, can include the following features. Dissociating the fluorescent polymer from the nanoclay includes introducing an organic solvent to the nanoclay.

This aspect, taken alone or combinable with any other aspect, can include the following features. The organic solvent comprises alcohol, acetone, acetonitrile, tetrahydrofuran, chloroform, or toluene.

The term "solvent" as used in this disclosure refers to a liquid that can dissolve a solid, another liquid, or a gas to form a solution. Non-limiting examples of solvents are silicones, organic compounds, water, alcohols, ionic liquids, and supercritical fluids.

The term "room temperature" as used in this disclosure refers to a temperature of about 15 degrees Celsius (° C.) to about 28° C.

The term "downhole" as used in this disclosure refers to under the surface of the earth, such as a location within or fluidly connected to a wellbore.

As used in this disclosure, the term "drilling fluid" refers to fluids, slurries, or muds used in drilling operations downhole, such as during the formation of the wellbore.

As used in this disclosure, the term "stimulation fluid" refers to fluids or slurries used downhole during stimulation activities of the well that can increase the production of a well, including perforation activities. In some examples, a stimulation fluid can include a fracturing fluid or an acidizing fluid.

As used in this disclosure, the term "fracturing fluid" refers to fluids or slurries used downhole during fracturing operations.

As used in this disclosure, the term "fluid" refers to liquids and gels, unless otherwise indicated.

As used in this disclosure, the term "subterranean material" or "subterranean zone" refers to any material under the surface of the earth, including under the surface of the bottom of the ocean. For example, a subterranean zone or material can be any section of a wellbore and any section of a subterranean petroleum- or water-producing formation or region in fluid contact with the wellbore. Placing a material in a subterranean zone can include contacting the material with any section of a wellbore or with any subterranean region in fluid contact the material. Subterranean materials can include any materials placed into the wellbore such as cement, drill shafts, liners, tubing, casing, or screens; placing a material in a subterranean zone can include contacting with such subterranean materials. In some examples, a subterranean zone or material can be any downhole region that can produce liquid or gaseous petroleum materials, water, or any downhole section in fluid contact with liquid or gaseous petroleum materials, or water. For example, a subterranean zone or material can be at least one of an area desired to be fractured, a fracture or an area surrounding a fracture, and a flow pathway or an area surrounding a flow pathway, in which a fracture or a flow pathway can be optionally fluidly connected to a subterranean petroleum- or water-producing region, directly or through one or more fractures or flow pathways.

As used in this disclosure, "treatment of a subterranean zone" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, aquifer remediation, identifying oil rich regions via imaging techniques, and the like.

As used in this disclosure, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some implementations, a flow pathway can be a water source and can include water. In some implementations, a flow pathway can be a petroleum source and can include petroleum. In some implementations, a flow pathway can be sufficient to divert water, a downhole fluid, or a produced hydrocarbon from a wellbore, fracture, or flow pathway connected to the pathway.

As used in this disclosure, "weight percent" (wt %) can be considered a mass fraction or a mass ratio of a substance to the total mixture or composition. Weight percent can be a weight-to-weight ratio or mass-to-mass ratio, unless indicated otherwise.

A number of implementations of the disclosure have been described. Nevertheless, it will be understood that various modifications may be made without departing from the spirit and scope of the disclosure.

What is claimed is:

1. A polymer-clay composite tag, comprising:

a nanoclay comprising a plurality of layers; and a polymer intercalated between the layers of the nanoclay, wherein the polymer is conjugated to a fluorescent dye, wherein the polymer comprises a polystyrene-based polymer or polyacrylate-based polymer, and wherein the polymer is non-covalently adsorbed to the nanoclay.

2. The polymer-clay composite tag of claim 1, wherein the polymer comprises polyethylenimine or polyallylamine.

3. The polymer-clay composite tag of claim 1, wherein the polystyrene-based polymer or polyacrylate-based polymer is synthesized from monomers selected from styrene, p-methylstyrene, p-methoxystyrene, 2,4-dimethylstyrene, 2,4,6-trimethylstyrene, 4-fluorostyrene, 3-fluorostyrene, 2-fluorostyrene, 4-chlorostyrene, 3-chlorostyrene, 2-chlorostyrene, 4-bromostyrene, 3-bromostyrene, 2-bromostyrene, 4-vinylbenzyl chloride, allylbenzene, allylpentafluorobenzene, acrylate, benzyl acrylate, phenyl methacrylate, hexyl methacrylate, butyl methacrylate, isobutyl methacrylate, propyl methacrylate, vinyl methacrylate, methyl methacrylate, 2-hydroxyethyl methacrylate, pentafluorophenyl methacrylate, N-allylbenzylamine, (vinylbenzyl) trimethylammonium chloride, and N,N dimethylvinylbenzylamine, or any combination thereof.

4. The polymer-clay composite tag of claim 1, wherein the fluorescent dye is an isothiocyanate-containing dye.

5. The polymer-clay composite tag of claim 4, wherein the isothiocyanate-containing dye comprises fluorescein isothiocyanate or Rhodamine B isothiocyanate.

6. A method of synthesizing a polymer-clay composite, comprising:

conjugating a polymer to a fluorescent dye to yield a fluorescent polymer; and intercalating and non-covalently adsorbing the fluorescent polymer in a nanoclay.

7. The method of claim 6, wherein the polymer comprises polyethylenimine or polyallylamine.

8. The method of claim 7, wherein functionalizing the polymer with a fluorescent dye comprises reacting polyethylenimine or polyallylamine with an isothiocyanate-containing dye.

9. The method of claim 6, wherein the fluorescent dye comprises an isothiocyanate-containing dye.

10. The method of claim 9, further comprising functionalizing the isothiocyanate- containing dye to include an allyl group.

11. The method of claim 10, wherein functionalizing the isothiocyanate-containing dye to include an allyl group comprises functionalizing the isothiocyanate dye with a monomer containing an allyl group, wherein the allyl group-containing monomers comprise monomers selected from the group consisting of allylamine, N-allylmethylamine, N-vinylformamide, 2-methyl-2-propen-1-amine, and 2-methylallylamine, 3-buten-1-amine, and 4 (or 3)-vinylaniline, or any combination thereof.

12. A method of synthesizing a polymer-clay composite, comprising:

intercalating and non-covalently adsorbing styrene-based monomers or acrylate-based monomers and a fluorescent dye between the layers of a nanoclay; and inducing radical polymerization to polymerize the styrene-based monomers and fluorescent dye or acrylate-based monomers and fluorescent dye to yield a fluorescent polymer-clay composite, wherein in the polymer-clay composite the fluorescent dye is conjugated to the polymerized styrene-based monomers or to the acrylate-based monomers.

13. The method of claim 12, wherein the styrene-based monomers or acrylate-based monomers comprise monomers selected from styrene, p-methylstyrene, p-methoxystyrene, 2,4-dimethylstyrene, 2,4,6-trimethylstyrene, 4-fluorostyrene, 3-fluorostyrene, 2-fluorostyrene, 4-chlorostyrene, 3-chlorostyrene, 2-chlorostyrene, 4-bromostyrene, 3-bromostyrene, 2-bromostyrene, 4-vinylbenzyl chloride, allylbenzene, allylpentafluorobenzene, acrylate, benzyl acrylate, phenyl methacrylate, hexyl methacrylate, butyl methacrylate, isobutyl methacrylate, propyl methacrylate, vinyl methacrylate, methyl methacrylate, 2-hydroxyethyl methacrylate, pentafluorophenyl methacrylate, N-allylbenzylamine, (vinylbenzyl) trimethylammonium chloride, and N,N dimethylvinylbenzylamine, or any combination thereof.

14. The method of claim 12, wherein inducing radical polymerization comprising inducing radical polymerization with a peroxide.

15. A method of determining the origin location of a subterranean sample, comprising:

mixing a polymer-clay composite tag into a fluid, wherein the polymer-clay composite tag comprises a nanoclay, wherein the nanoclay comprises layers, and a fluorescent polymer intercalated and non-covalently adsorbed between the layers of the nanoclay, wherein the fluorescent polymer comprises a polymer conjugated to a fluorescent dye, and wherein the fluorescent polymer comprises a polystyrene-based polymer or polyacrylate-based polymer;

flowing the fluid through a work string into a subterranean formation;

recovering subterranean samples from the subterranean formation; and determining the origin location of the subterranean sample by detecting the presence of the polymer-clay composite tag.

16. The method of claim 15, wherein detecting the presence of the polymer-clay composite tag comprises analyzing the subterranean sample for a fluorescence signal.

17. The method of claim 16, further comprising analyzing the fluorescent polymer with mass spectrometry.

18. The method of claim 17, wherein analyzing the fluorescent polymer with mass spectrometry further comprises dissociating the fluorescent polymer from the nanoclay before analyzing with mass spectrometry.

19. The method of claim 18, wherein the fluorescent polymer comprises polyethylenimine or polyallylamine.

20. The method of claim 19, wherein dissociating the fluorescent polymer from the nanoclay comprises raising the pH of the polymer-clay composite tag.

21. The method of claim 17, wherein analyzing the fluorescent polymer with mass spectrometry comprises:

degrading the polymer via a pyrolysis process; and identifying the degradation products through a pyrolysis gas chromatography-mass spectroscopy (Pyrolysis-GC-MS) process.

22. The method of claim 15, wherein the polystyrene-based polymer or polyacrylate-based polymer is synthesized from monomers selected from styrene, p-methylstyrene, p-methoxystyrene, 2,4-dimethylstyrene, 2,4,6-trimethylstyrene, 4-fluorostyrene, 3-fluorostyrene, 2-fluorostyrene, 4-chlorostyrene, 3-chlorostyrene, 2-chlorostyrene, 4-bromostyrene, 3-bromostyrene, 2-bromostyrene, 4-vinylbenzyl chloride, allylbenzene, allylpentafluorobenzene, acrylate, benzyl acrylate, phenyl methacrylate, hexyl methacrylate, butyl methacrylate, isobutyl methacrylate, propyl methacrylate, vinyl methacrylate, methyl methacrylate, 2-hydroxyethyl methacrylate, pentafluorophenyl methacrylate, N-allylbenzylamine, (vinylbenzyl) trimethylammonium chloride, and N,N dimethylvinylbenzylamine, or any combination thereof.

23. The method of claim 15, wherein dissociating the fluorescent polymer from the nanoclay comprises introducing an organic solvent to the nanoclay.

24. The method of claim 23, wherein the organic solvent comprises alcohol, acetone, acetonitrile, tetrahydrofuran, chloroform, or toluene.

* * * * *